(12) United States Patent
Takeda et al.

(10) Patent No.: US 12,363,723 B2
(45) Date of Patent: Jul. 15, 2025

(54) USER EQUIPMENT, BASE STATION APPARATUS AND COMMUNICATION METHOD

(71) Applicant: NTT DOCOMO, INC., Tokyo (JP)

(72) Inventors: Daiki Takeda, Tokyo (JP); Kazuaki Takeda, Tokyo (JP); Hiroki Harada, Tokyo (JP); Takayuki Isogawa, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 326 days.

(21) Appl. No.: 17/598,143

(22) PCT Filed: Mar. 29, 2019

(86) PCT No.: PCT/JP2019/014358
§ 371 (c)(1),
(2) Date: Sep. 24, 2021

(87) PCT Pub. No.: WO2020/202399
PCT Pub. Date: Oct. 8, 2020

(65) Prior Publication Data
US 2022/0167385 A1  May 26, 2022

(51) Int. Cl.
*H04W 72/23* (2023.01)
*H04L 5/00* (2006.01)

(52) U.S. Cl.
CPC ........... *H04W 72/23* (2023.01); *H04L 5/0055* (2013.01)

(58) Field of Classification Search
CPC . H04W 72/23; H04W 56/00; H04W 72/1268; H04L 5/0055; H04L 1/1854; H04L 1/1671; Y02D 30/70
See application file for complete search history.

(56) References Cited

U.S. PATENT DOCUMENTS

| | | | |
|---|---|---|---|
| 9,844,006 B2* | 12/2017 | Dinan | H04W 74/0833 |
| 11,013,011 B2* | 5/2021 | Dinan | H04W 56/0045 |
| 11,051,362 B2* | 6/2021 | Wang | H04L 5/0082 |
| 11,540,289 B2* | 12/2022 | Ou | H04W 72/21 |
| 11,558,842 B2* | 1/2023 | Kim | H04W 56/001 |
| 11,696,323 B2* | 7/2023 | Yoshimura | H04W 72/04 370/329 |

(Continued)

FOREIGN PATENT DOCUMENTS

| | | | |
|---|---|---|---|
| CN | 103228038 | * | 7/2013 |
| CN | 103228038 A | * | 7/2013 |

(Continued)

OTHER PUBLICATIONS

D. Carrillo, G. G. Neto, S. M. Sakai, W. L. Souza, R. T. Caldeira and J. J. Bazzo, "A low-cost test platform to estimate the LTE timing advance procedure," 2016 8th IEEE Latin-American Conference on Communications (LATINCOM), Medellin, Colombia, 2016, pp. 1-6 (Year: 2016).*

(Continued)

*Primary Examiner* — Yuwen Pan
*Assistant Examiner* — Swati Jain
(74) *Attorney, Agent, or Firm* — Osha Bergman Watanabe & Burton LLP

(57) ABSTRACT

A user equipment including: a transmission unit that transmits a signal to a base station apparatus using a preconfigured uplink resource; a reception unit that receives a signal from the base station apparatus; and a control unit that starts or restarts a predetermined timer in response to receiving the signal from the base station apparatus.

4 Claims, 12 Drawing Sheets

(56) References Cited

U.S. PATENT DOCUMENTS

| | | | | |
|---|---|---|---|---|
| 11,800,477 | B2* | 10/2023 | Jiang | H04W 56/0015 |
| 2009/0298524 | A1* | 12/2009 | Kuo | H04W 76/38 |
| | | | | 455/509 |
| 2012/0300751 | A1* | 11/2012 | Arai | H04L 1/0026 |
| | | | | 370/336 |
| 2013/0100938 | A1* | 4/2013 | Kwon | H04L 27/2655 |
| | | | | 370/336 |
| 2014/0050213 | A1* | 2/2014 | Nguyen | H04W 56/0045 |
| | | | | 370/350 |
| 2014/0092855 | A1* | 4/2014 | Ahn | H04W 56/0045 |
| | | | | 370/329 |
| 2014/0355504 | A1* | 12/2014 | Du | H04W 56/001 |
| | | | | 370/311 |
| 2016/0021629 | A1* | 1/2016 | Jang | H04W 72/23 |
| | | | | 370/328 |
| 2018/0084546 | A1* | 3/2018 | Guo | H04B 7/0695 |
| 2018/0198665 | A1* | 7/2018 | Guo | H04W 56/0005 |
| 2020/0107396 | A1* | 4/2020 | Wang | H04L 5/0082 |
| 2020/0196264 | A1* | 6/2020 | Shih | H04W 74/0833 |
| 2020/0221436 | A1* | 7/2020 | Jang | H04W 56/001 |
| 2020/0337011 | A1* | 10/2020 | Jiang | H04W 56/0015 |
| 2021/0168746 | A1* | 6/2021 | Mi | H04W 56/0055 |
| 2021/0306968 | A1* | 9/2021 | Liberg | H04W 56/0045 |
| 2021/0377895 | A1* | 12/2021 | Bi | H04W 74/0841 |
| 2022/0007391 | A1* | 1/2022 | Höglund et al. | H04W 72/1268 |
| 2022/0038997 | A1* | 2/2022 | Höglund | H04W 48/06 |
| 2022/0094508 | A1* | 3/2022 | Keating | H04L 5/0048 |
| 2022/0104225 | A1* | 3/2022 | Yan | H04W 72/1268 |
| 2022/0159598 | A1* | 5/2022 | Kim | H04W 72/0446 |
| 2022/0225258 | A1* | 7/2022 | Ratasuk | H04W 72/20 |
| 2022/0353026 | A1* | 11/2022 | Yeo | H04L 5/0007 |
| 2024/0129873 | A1* | 4/2024 | Höglund et al. | H04W 56/0045 |

FOREIGN PATENT DOCUMENTS

| | | | | |
|---|---|---|---|---|
| JP | 2014165704 | A | * | 9/2014 |
| JP | 2020-096352 | A | | 6/2020 |
| WO | WO-2019136649 | A1 | * | 7/2019 ........ H04W 56/0005 |

OTHER PUBLICATIONS

ZTE Corporation, Sanechips, Further consideration on DL aspects of D-PUR in IDLE, 3GPP TSG-RAN2 meeting #105 R2-1901479 , Mar. 1, 2019 (Year: 2019).*

ZTE Corporation, Further consideration on UL aspects of D-PUR in IDLE, 3GPP TSG-RAN2 meeting #105 R2-1901477, Mar. 1, 2019 (Year: 2019).*

ZTE Corporation, Sanechips, Further consideration on DL aspects of D-PUR in IDLE, 3GPP TSG-RAN2 meeting #105 R2-1901479 , Mar. 1, 2019 (Year: 2019) (Year: 2019).*

ZTE Corporation, Further consideration on UL aspects of D-PUR in IDLE, 3GPP TSG-RAN2 meeting #105 R2-1901477, Mar. 1, 2019 (Year: 2019) (Year: 2019).*

Huawei, HI Silicon, Transmission in preconfigured UL resources3GPP TSG RAN WGI Meeting #95 Spokane, USA, Nov. 12-16, 2018 (Year: 2018).*

3GPP TSG RAN, WG1, R1-1903513, Huawei, HiSilicon, Updated feature lead summary of Support for transmission in preconfigured UL resources, Athens, Greece, Feb. 25-Mar. 1, 2019. (Year: 2019).*

International Search Report issued in PCT/JP2019/014358 on Jun. 4, 2019 (5 pages).

Written Opinion of the International Searching Authority issued in PCT/JP2019/014358 on Jun. 4, 2019 (4 pages).

ZTE Corporation, Sanechips; "Further consideration on DL aspects of D-PUR in IDLE"; 3GPP TSG-RAN2 meeting #105, R2-1901479; Athens, Greece; Fe. 25-Mar. 1, 2019 (8 pages).

3GPP TS 36.321 V15.4.0; "3rd Generation Partnership Project; Technical Specification Group Radio Access Network; Evolved Universal Terrestrial Radio Access (E-UTRA); Medium Access Control (MAC) protocol specification (Release 15)"; Dec. 2018 (131 pages).

Office Action issued in the counterpart Japanese Patent Application No. 2021-511772, mailed on Sep. 27, 2022 (5 pages).

Huawei, HiSilicon; "Updated feature lead summary of Support for transmission in preconfigured UL resources"; 3GPP TSG RAN WG1 Meeting #96, R1-1903513; Athens, Greece; Feb. 25-Mar. 1, 2019 (7 pages).

Office Action issued in the counterpart Chinese Patent Application No. 201980094646.1, mailed on May 25, 2023 (21 pages).

ZTE Corporation; "Further consideration on UL aspects of D-PUR in IDLE"; 3GPP TSG-RAN2 meeting#105, R2-1901477; Athens, Greece; Feb. 25-Mar. 1, 2019 (11 pages).

Huawei, HiSilicon; "Transmission in preconfigured UL resources"; 3GPP TSG RAN WG1 Meeting #95, R1-1812134; Spokane, USA; Nov. 12-16, 2018 (8 pages).

Office Action issued in the counterpart Japanese Patent Application No. 2021-511772, mailed on Feb. 21, 2023 (6 pages).

* cited by examiner

USER EQUIPMENT, BASE STATION APPARATUS AND COMMUNICATION METHOD

TECHNICAL FIELD

The present invention relates to a user equipment and a base station apparatus in a wireless communication system.

BACKGROUND ART

Discussions are currently underway on Preconfigured Uplink (UL) Resources (PUR) in the 3rd Generation Partnership Project (3GPP) for LTE Internet of Things (IoT), i.e., NB-IoT (Narrow Band IoT) or eMTC (enhanced Machine Type Communication) release 16 Enhancement.

In addition, power saving for idle mode user equipments may be discussed in New Radio (NR) in 3GPP release 17 or later. In this case, a (Grant less or Grant Free) transmission method which does not assume assignment of radio resources from the network side to the user equipment may be specified in NR for idle mode user equipments.

Wireless communication using the PUR mainly covers eMTC/NB-IoT enhancement of 3GPP release 16, but wireless communication using the PUR is not limited to eMTC/NB-IoT enhancement of 3GPP release 16 and is assumed to be applied to the NR system.

PRIOR ART DOCUMENTS

Non-Patent Documents

[Non-Patent Document 1] 3GPP TS 36.321 V15.4.0 (2018-12)

SUMMARY OF INVENTION

Problem to be Solved by the Invention

In a wireless communication system defined in 3GPP, timing advance (hereinafter, TA) is used to align the timing in uplink at the base station apparatus side (for example, Non-Patent Document 1). In addition, a time alignment timer (hereinafter referred to as "TA timer") to time a valid period of the timing advance is used.

However, in uplink transmission using PUR, there is no provision and the like regarding the TA timer. Therefore, the TA timer cannot be controlled appropriately, and as a result, control of valid/invalid of the timing advance may not be properly performed when uplink transmission using PUR is performed.

The above-described problem of inability to appropriately control the TA timer is a problem that may arise not only in the TA timer but also in other timers in uplink transmission using the PUR.

The present invention has been made in view of the foregoing, and is intended to provide a technique that enables timer control to be performed appropriately in a wireless communication system where transmission is performed using preconfigured uplink resources.

Means for Solving Problems

According to the disclosed technique, there is provided a user equipment including:
  a transmission unit that transmits a signal to a base station apparatus using a preconfigured uplink resource;
  a reception unit that receives a signal from the base station apparatus; and
  a control unit that starts or restarts a predetermined timer in response to receiving the signal from the base station apparatus.

Effects of the Invention

According to the disclosed technique, a technique is provided that allows timer control to be performed appropriately in a wireless communication system where transmission is performed using preconfigured uplink resources.

MODE FOR CARRYING OUT THE INVENTION

Hereinafter, embodiments of the present invention will be described with reference to the drawings. The embodiments described below are examples, and the embodiments to which the present invention is applied are not limited to the following embodiments.

In the following description, the operation of the user equipment in the idle mode is mainly targeted, but the technology described below may be applied not only to the user equipment in the idle mode but also to the user equipment in the connected mode.

(System Configuration)

Figure 1:
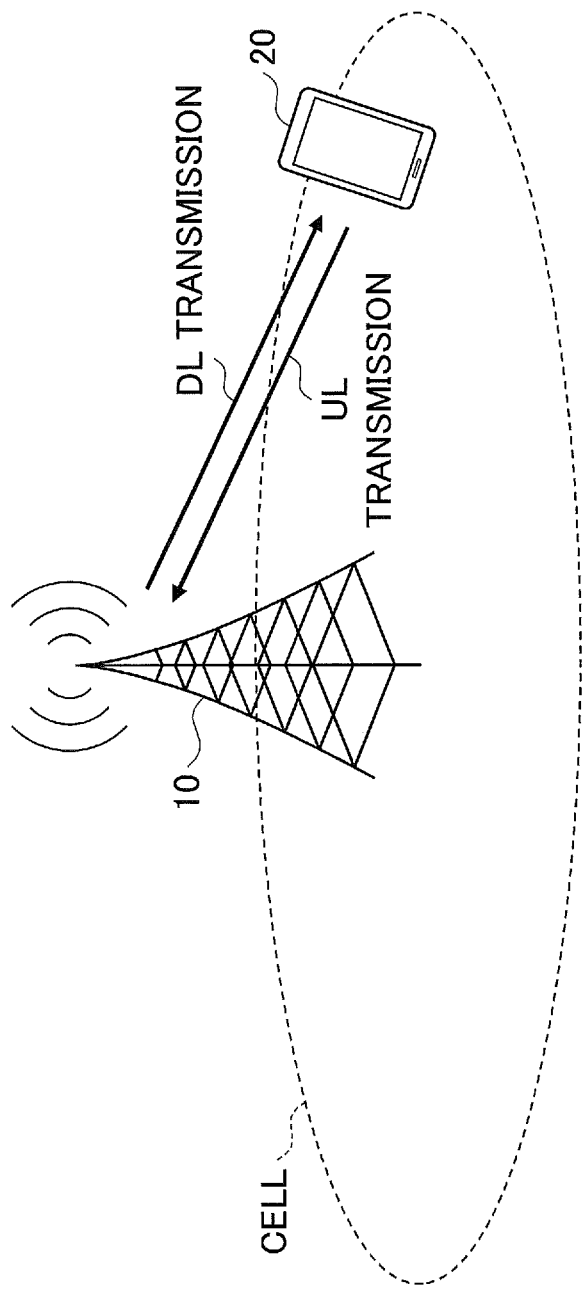
FIG. 1 is a diagram for explaining a wireless communication system according to an embodiment of the present invention.

FIG. 1 is a diagram illustrating a wireless communication system according to an embodiment of the present invention. A wireless communication system in an embodiment of the present invention includes a base station apparatus 10 and a user equipment 20, as shown in FIG. 1. In FIG. 1, one base station apparatus 10 and one user equipment 20 are shown, but this is an example and a plurality of base station apparatuses and a plurality of user equipments may be provided.

The base station apparatus 10 is a communication apparatus that provides one or more cells and performs wireless communication with the user equipment 20. The physical resources of a radio signal are defined in the time domain and the frequency domain, the time domain may be defined in OFDM symbols, and the frequency domain may be defined in subcarriers or resource blocks. TTI (Transmission Time Interval) in the time domain may be a slot, or the TTI may be a subframe.

The base station apparatus 10 transmits a synchronization signal and system information to the user equipment 20. The synchronization signal is, for example, PSS and SSS. The system information is transmitted in, for example, NR-PBCH or PDSCH and is also referred to as broadcast information. As illustrated in FIG. 1, the base station apparatus 10 transmits a control signal or data to the user equipment 20 through DL (Downlink), and receives a control signal or data from the user equipment 20 through UL (Uplink). It should be noted that, here, those transmitted in control channels such as PUCCH, PDCCH, and the like are referred to as control signals, and those transmitted in shared channels such as PUSCH, PDSCH, and the like are referred to as data, but such a way in which the signals are referred to is only an example. For example, the control information and the data may be collectively referred to as "signal".

The user equipment 20 is a communication apparatus equipped with a wireless communication function such as a smartphone, a mobile phone, a tablet, a wearable terminal, and a communication module for M2M (Machine-to-Machine). As illustrated in FIG. 1, the user equipment 20 receives control signals or data from the base station apparatus 10 in DL, and transmits control signals or data to the base station apparatus 10 in UL, thereby using various communication services provided by the wireless communication system. It should be noted that the user equipment 20 may be referred to as a UE, and the base station apparatus 10 may be referred to as a eNB (or gNB).

(Preconfigured Uplink Resources (PUR))

Since the present embodiment assumes the use of a preconfigured uplink resource (PUR), an operation example of the wireless communication system related to the PUR will first be described with reference to FIG. 2. Although the PUR-based wireless communication described in FIG. 2 below is primarily directed to eMTC/NB-IoT enhancement of the 3GPP release 16, the PUR-based wireless communication is not limited to eMTC/NB-IoT enhancement of the 3GPP release 16 and may be applied to the NR system. Also, wireless communication using PUR may be applied to a wireless communication system that differs from either LTE or NR.

Figure 2:
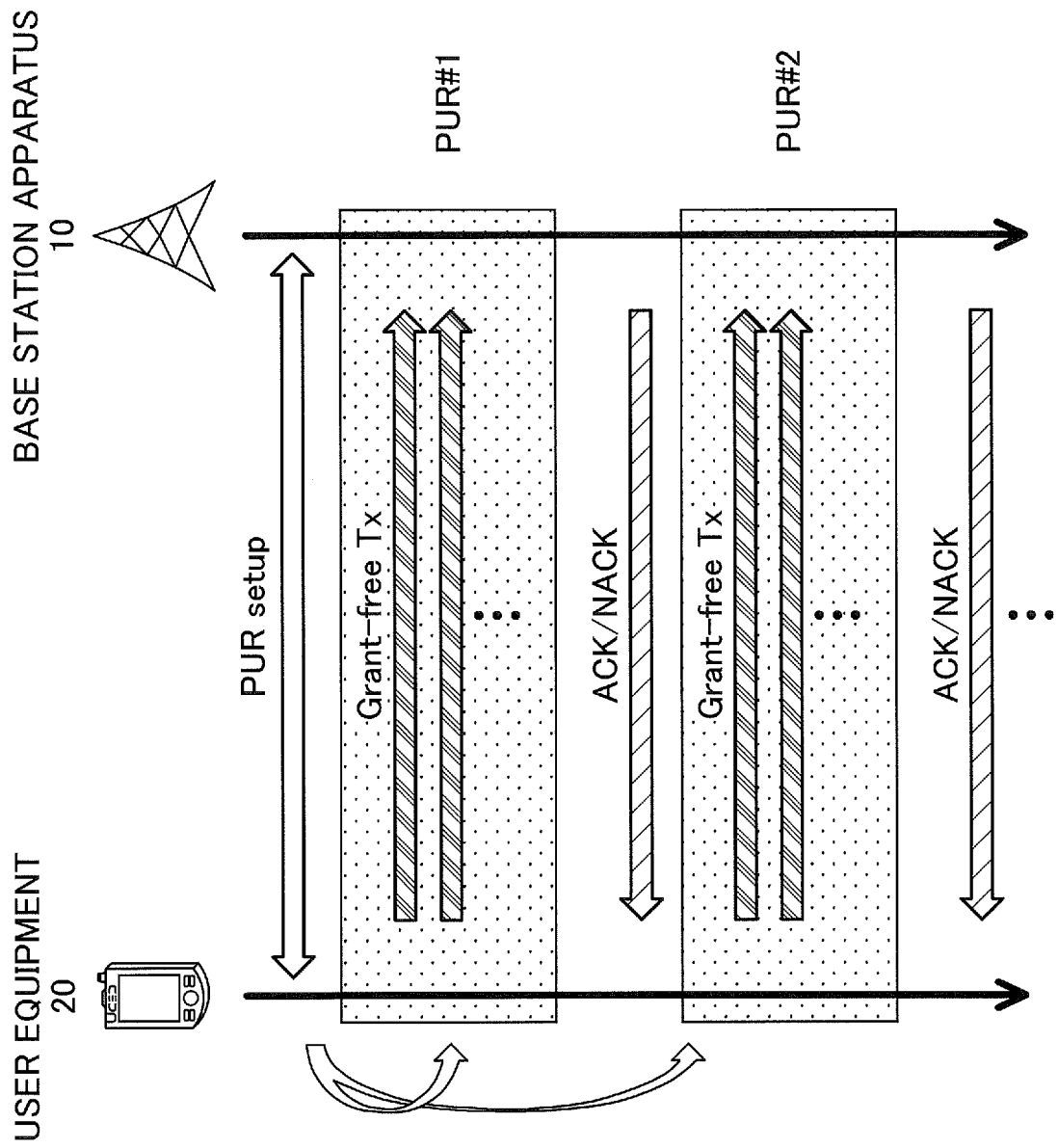
FIG. 2 is a diagram showing an example of radio communication using PUR.

As shown in FIG. 2, before performing communication, PUR setup is performed between the base station apparatus 10 and the user equipment 20 for the user equipment 20 to transmit data. Thereafter, the user equipment 20 periodically transmits data, for example, using a PUR. That is, after configuring the PUR between the base station apparatus 10 and the user equipment 20, the user equipment 20 can transmit data using the PUR without being separately allocated uplink radio resources from the base station apparatus 10.

In the data transmission method of the user apparatus 20 using the above-described PUR, it is assumed that data transmission is performed by the user apparatus 20 in the idle mode (idle mode). In this regard, the method of data transmission using the above-described PUR is different from the method of data transmission of the user equipment 20 using semi-persistent scheduling.

(Type of PUR)

The following three types of PUR can be used in this embodiment. However, the following three types are examples and are not limited thereto.
 (1) Dedicated PUR
 (2) Contention-based shared preconfigured UL resource (CBS PUR)
 (3) Contention-free shared preconfigured UL resource (CFS PUR)

The Dedicated PUR described in (1) above is PUR that is configured exclusively for each user equipments 20. When the user equipment 20 transmits data using a dedicated PUR, the transmission resource is a dedicated resource, so a conflict resolution procedure need not be applied. When configuring this Dedicated PUR, the method of resource allocation in the semi-permanent scheduling of the LTE may be diverted.

The Contention-based shared UL resource (CBS PUR) in (2) above is a PUR shared between a plurality of user equipments 20. When multiple user equipments 20 performs transmission by a CBS PUR, transmissions may conflict between multiple user equipments 20. Accordingly, when multiple user equipments 20 performs transmission by the CBS PUR, a procedure for resolving conflicts is applied.

In the Contention-free shared preconfigured UL resource (CFS PUR) described in (3) above, the PUR is shared among a plurality of user equipments 20, but a conflict resolution mechanism is not required.

For example, as examples for the CFS PUR, there are a CFS PUR using Multi-user Multiple Input and Multiple Output (MU-MIMO). In this case, demodulation reference signals (DM-RS, UE specific RS) are individually assigned to a plurality of user equipments 20, and channel estimation in the base station apparatus 10 can be individually performed on a plurality of user equipments 20. Data itself can be transmitted using the same time and frequency resources by MU-MIMO for a plurality of user equipments 20.

Figure 3:
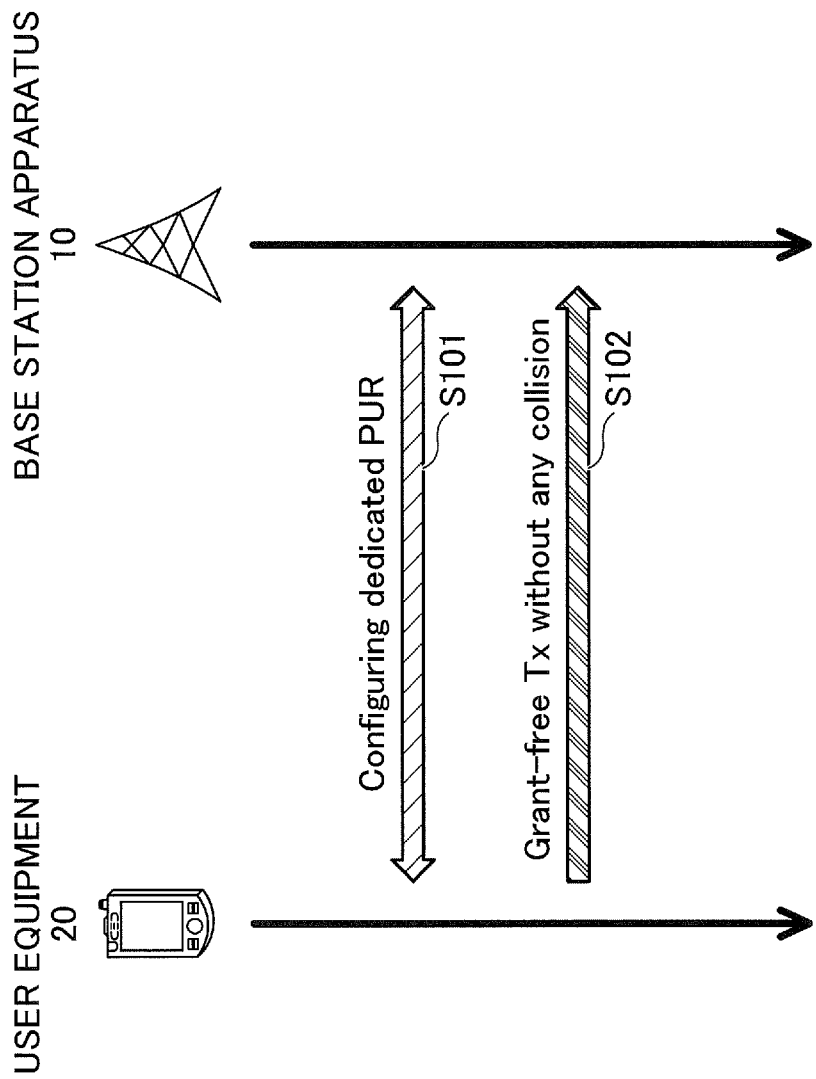
FIG. 3 is a diagram illustrating an example of a data transmission operation by a user equipment using a Dedicated PUR.

FIG. 3 is a diagram illustrating an example of a data transmission operation by the user equipment 20 using the (1) dedicated PUR. First, in S101, the user equipment 20 and the base station apparatus 10 configures the dedicated PUR. Thereafter, the user equipment 20 transmits data using the dedicated PUR at a desired timing of timings in which the dedicated PUR is configured (S102). When transmitting data, the user equipment 20 may transmit the data while the user equipment 20 is in the idle mode.

Figure 4:
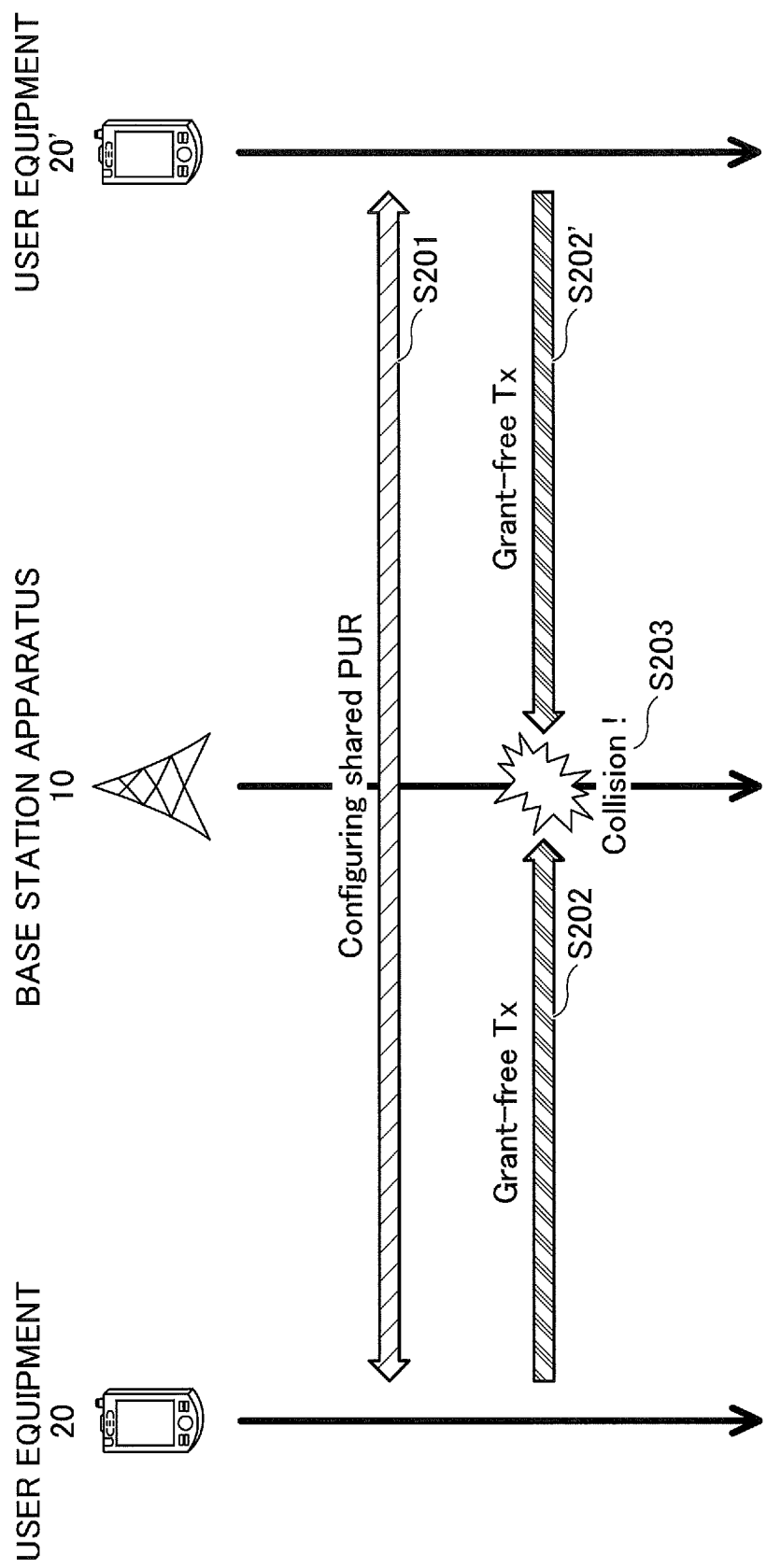
FIG. 4 is a diagram illustrating an example of a data transmission operation by a user equipment using a CBS PUR.

FIG. 4 is a diagram illustrating an example of a data transmission operation by the user equipment 20 using the (2) CBS PUR. First, in S201, the plurality of user equipments 20 and the base station apparatus 10 configures the shared PUR. Next, in S202, the user equipment 20 transmits data using the shared PUR. At this time, in S202', a user equipment 20' transmits data using the shared PUR.

In this case, in the base station apparatus 10, conflict may occur between data transmitted from the user equipment 20 and data transmitted from the user equipment 20' in S203. Accordingly, the base station apparatus 10 subsequently performs a conflict resolution procedure. For example, the base station apparatus 10 may instruct the user equipment 20 to retransmit data using a PUR at a specified timing.

Figure 5:
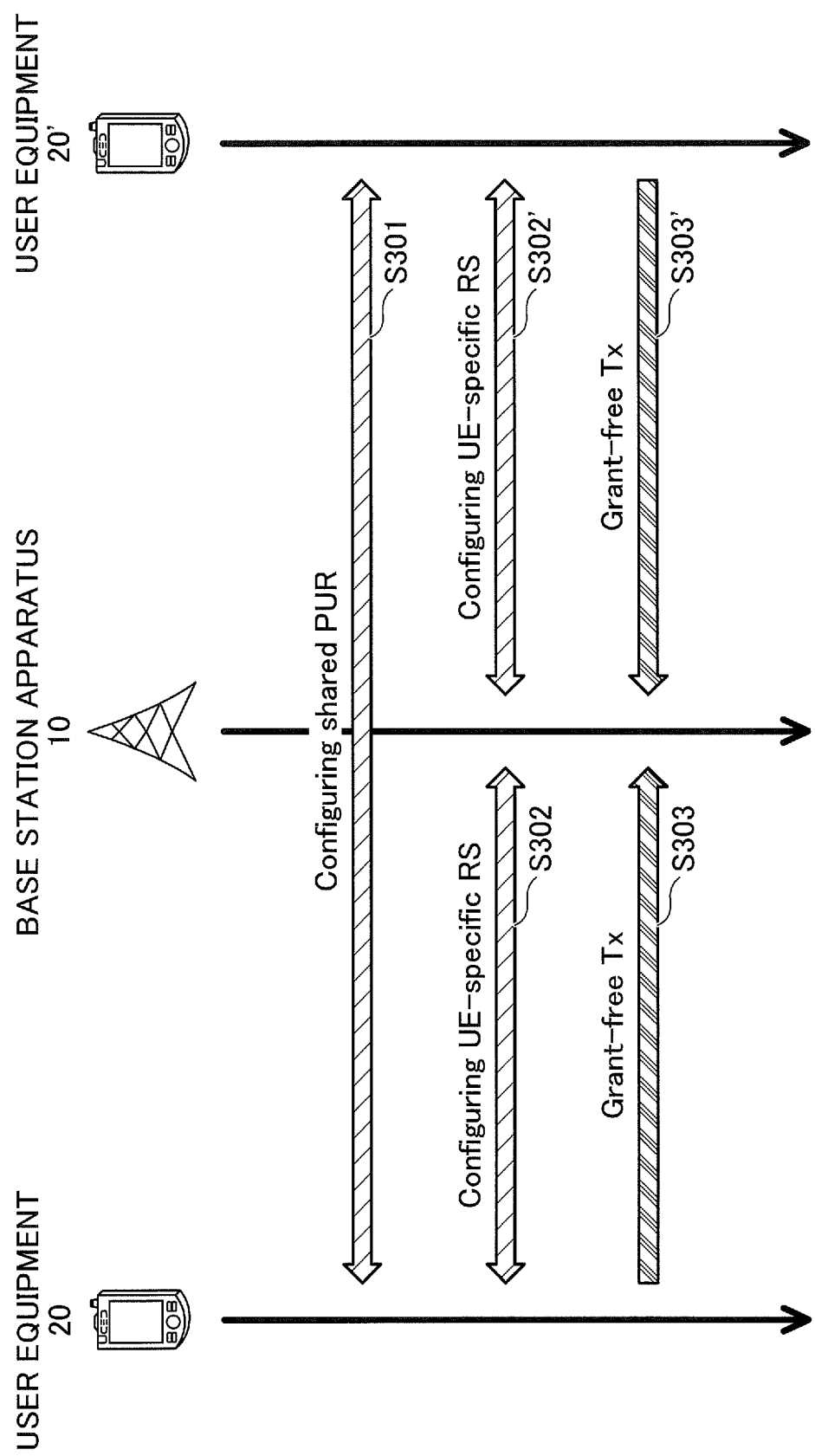
FIG. 5 is a diagram illustrating an example of a data transmission operation by a user equipment using a CFS PUR.

FIG. 5 is a diagram illustrating an example of a data transmission operation by the user equipment 20 using the (3) CFS PUR. First, in S301, the plurality of user equipments 20 and the base station apparatus 10 configures the shared PUR. Next, in S302, the base station apparatus 10 configures UE-specific RS to the user equipment 20 (in S302', the base station apparatus 10 configures UE-specific RS to the user equipment 20').

Next, in S303, the user equipment 20 transmits data using the PUR configured in S301 and the UE-specific RS configured in S302. At this time, in S303', the user equipment 20' transmits data using the PUR configured in S301 and the UE-specific RS configured in S302'. Here, since MU-MIMO is used, data transmitted from the user equipment 20 and data transmitted from the user equipment 20' can be separately received by the base station apparatus 10 without resolving conflicts.

(ACK/NACK Feedback)

In the wireless communication system according to the present embodiment, for example, operation of option 1 or option 2 described below can be performed as an operation when the idle mode user equipment 20 receives transmission acknowledgement information (acknowledgment (ACK)/negative acknowledgement (NACK)) transmitted from the base station apparatus 10 after transmitting data without a grant from the base station apparatus 10.

<Option 1>

The user equipment 20 uses a paging search space to receive transmittal acknowledgment information transmitted from the base station apparatus 10. The idle mode user equipment 20 also monitors a paging signal and a broadcast signal. Accordingly, the idle mode user equipment 20 can receive the transmittal acknowledgment information transmitted from the base station apparatus 10 by monitoring the paging search space after transmitting data using a PUR.

<Option 2>

The paging search space alone may not be sufficient for resource used for ACK/NACK feedback for PUR. Therefore, in option 2, an additional search space is defined so that the user equipment 20 receives transmittal acknowledgement information for transmission of data by the user equipment 20 using a PUR.

Figure 6:
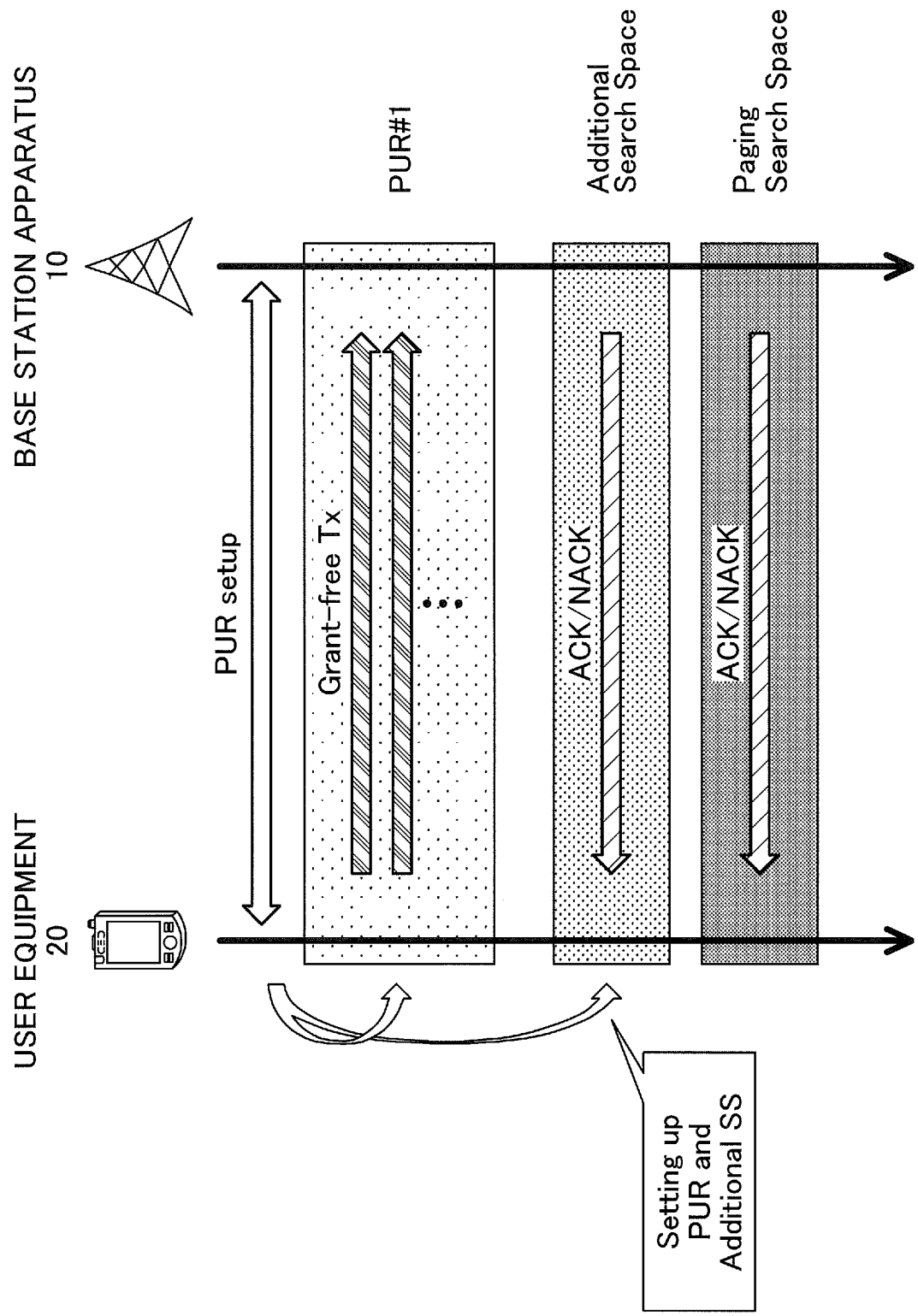
FIG. 6 is a diagram showing an example of configuring additional search space in addition to a search space for paging.

Then, by configuring the idle mode user equipment 20 to monitor additional search space in addition to the paging search space, the idle mode user equipment 20 can receive transmittal acknowledgement information. FIG. 6 illustrates an example of configuring additional search space in addition to the paging search space.

For the search space monitored by the user equipment 20, for example, the network (i.e., the base station apparatus 10) configures it for the user equipment 20. For example, if a PUR is configured for the user equipment 20, the user equipment 20 may be configured to monitor only the paging search space. Alternatively, the user equipment 20 may be configured to monitor only an additional search space. Alternatively, the user equipment 20 may be configured to monitor both the paging search space and the additional search space.

As an arrangement method of the additional search space, the additional search space can be arranged, for example, by placing the additional search space in the same period as the period of the PUR when the PUR is configured periodically. For example, the additional search space may be placed immediately after the PUR (in the temporal direction).

Alternatively, the additional search space may be placed between one PUR and another PUR. That is, the position at which additional search space is placed may be specified as a relative position from the PUR. Additional search space may also be located in association with placement of the PUR. For example, one additional search space may be placed for two sets of PUR.

For example, the additional search space may be configured when configuring the PUR between the user equipment 20 and the base station apparatus 10. That is, configuration information of the PUR transmitted from the base station apparatus 10 to the user equipment 20 may include configuration information of the additional search space. If the PUR is configured periodically, the time position of the additional search space may be associated with the time position of the PUR, or the period of the additional search space may be associated with the period of the PUR, or the period of the additional search space may be the same as the period of the PUR.

As a Radio Network Temporary Identifier (RNTI) used by the user equipment 20 to monitor the additional search space, an RNTI for paging may be used, or an RNTI assigned in connected mode may be used also in idle mode. Alternatively, a RNTI specifically for the additional search space may be defined and blind decoding for the additional search space may be performed using the RNTI specifically for the additional search space.

(About TA)

For performing uplink transmission by using the PUR, the user equipment 20 must have a proper timing of transmission of the user equipment 20 itself, i.e., a proper timing advance (TA: Timing Advance).

When transmitting data using the PUR, the idle mode user equipment 20 verifies whether the TA it holds is valid or not, and if it does not have a valid TA, the user equipment 20 falls back to, for example, a Random Access Channel (RACH) procedure or an Early Data Transmission (EDT) procedure to acquire a proper TA.

With regard to validation of the TA (TA validation), in the present embodiment, the user equipment 20 can perform validation, for example, by the following methods.

(1) When a serving cell is changed, the user equipment 20 determines that TA that was valid in the previous serving cell is not valid.

(2) The user equipment 20 determines that TA is valid when the Time Alignment Timer is running. Conventionally, it is understood that the Time Alignment Timer can be used only by the user equipment 20 in the connected mode, but the present embodiment extends to allow the time alignment Timer to be used by the user equipment 20 in the idle mode. This may be referred to as a "PUR Time Alignment Timer". The "PUR Time Alignment Timer" is hereinafter referred to as "TA timer".

(3) The user equipment 20 measures a reference signal received power (RSRP) of the serving cell, and when it detects that the RSRP of the serving cell has changed significantly (for example, when the RSRP of the serving cell has changed by a value equal to or more than a certain threshold value), the user equipment 20 determines that the TA held so far is not valid.

Figure 7:
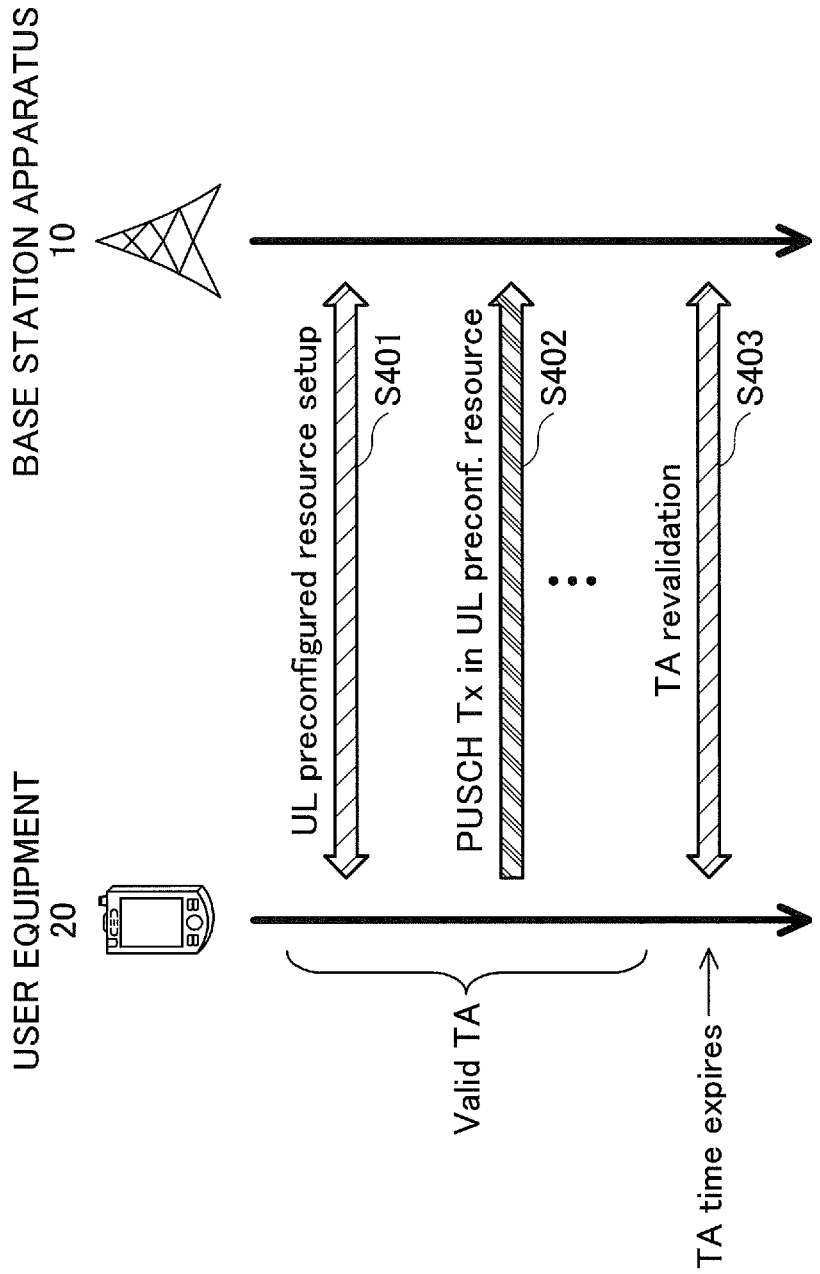
FIG. 7 is a diagram showing an example of a method of verifying again that the TA timer is appropriate when the TA timer expires.

FIG. 7 shows a sequence example in which the validation method using the TA timer described in (2) above is used. In the example of FIG. 7, since the TA timer has not expired at the time of S401 and S402, the user equipment 20 determines that the TA held by the user equipment is valid. When the TA timer expires in S403, the user equipment 20 determines that TA is not valid.

(About the TA Timer)

In the wireless communication system according to the present embodiment, the base station apparatus 10 transmits TA verification configuration information (TA validation configuration) to the user equipment 20. The TA verification configuration information may include a setting value of the TA timer.

The setting value of the TA timer may be specific to each user equipment or it may be common within the cell. The setting value of the TA timer may be a value representing the time length of the timer. The value may be represented by the number of subframes or slots or by the number of symbols. In addition, the expression "TA timer" may indicate the setting value of the TA timer.

The user equipment 20, for example, determines that TA is invalid when "(current time-latest TA update time)>TA timer." For example, assuming that the setting value (maximum value) of the TA timer is 10 minutes, when the latest TA start (or restart) time is "14:40" and the current time is "14:51," the user equipment 20 determines that the TA is invalid at the current time.

In this embodiment, the "TA timer" has, for example, a setting value (the maximum value of the TA timer configured by the base station apparatus 10) before starting, and after starting (start), the value is reduced with the passage of time, and when it is 0, the TA timer expires. When the TA timer starts after expiration, it starts from the setting value again, the value is reduced with the passage of time, and the TA timer expires when the value reaches 0. If the TA timer is restarted while it is running (after start and before expiration), the TA timer starts at the setting value again, and the value is reduced with the passage of time, and the TA timer expires when the value is zero.

In addition, the "TA timer" may be such that the value is 0 before startup, and when it is started, the value increases with the passage of time, and the TA timer expires when the value reaches the setting value. If the TA timer starts after expiration, it starts at 0 again, and the value increases with the passage of time, and the TA timer expires when the value reaches the setting value. If the TA timer is restarted while it is running, it starts at 0 again, and the value is increased with the passage of time, and the TA timer expires when the value becomes the setting value.

However, the operation of the TA timer as described above is an example, and other operations may be performed.

Hereinafter, a detailed example of the control related to the TA timer according to the present embodiment will be described as an example.

(Example)

In the present example, the base station apparatus 10 and the user equipment 20 each have a TA timer for managing time alignment for transmission using a PUR. More specifically, the TA timer clocks a validity period of the retained timing advance (value).

In the present embodiment, the base station apparatus 10 can transmit a PUR_TA command to the user equipment 20. The PUR_TA command is a TA command for the user equipment 20 for which PUR is configured. It is a TA command other than the TA command included in the MAC RAR or Timing Advance Command MAC CE already specified in the 3GPP specification. However, the TA command included in the MAC RAR or Timing Advance Command MAC CE already specified in the 3GPP specification may be diverted as the PUR_TA command.

The PUR_TA command may be based on, for example, DCI or UL grant transmitted by paging PDCCH in a paging search space or based on DCI or UL grant transmitted by PDCCH (paging PDCCH or other PDCCH) in an additional search space.

"Based on DCI or UL grant" means that the PUR_TA command may be included in the DCI or the UL grant, or the PUR_TA command may be transmitted in resources specified by the DCI or the UL grant.

The PUR_TA command may also be transmitted from the base station apparatus 10 to the user equipment 20 together with an explicit ACK, an explicit NACK, or UL grant (if supported) for PUR transmission.

Note that the explicit ACK or the explicit NACK is not an implicit ACK/NACK (for example, an ACK is assumed to be present unless a retransmission request is received), but is ACK or NACK that is explicitly transmitted. Hereinafter, unless otherwise specified, ACK and NACK mean explicit ACK and explicit NACK.

As will be described later, in the present example, the TA timer in the user equipment 20 can be restarted by the PUR_TA command.

The user equipment 20 may start or restart the TA timer by receiving an activation signal (WUS: wake-up signal) from the base station apparatus 10. WUS is a signal introduced for power saving of IoT-UE (NB-IoT/eMTC).

The PUR_TA command, like the Timing Advance Command MAC CE, contains an adjustment value for TA. However, the PUR_TA command may not include the adjustment value of TA. For example, when the user equipment 20 is a terminal with little movement, a PUR_TA command that does not include the adjustment value of the TA may be used.

In the present example, the user equipment 20 may take over the TA acquired in the connected mode before it enters into the idle mode and use it for timing adjustment of transmission in the idle mode. If TA becomes invalid during idle mode, a proper TA can be obtained again by falling back to the Random Access Channel (RACH) procedure or Early Data Transmission (EDT) procedure.

Figure 8:
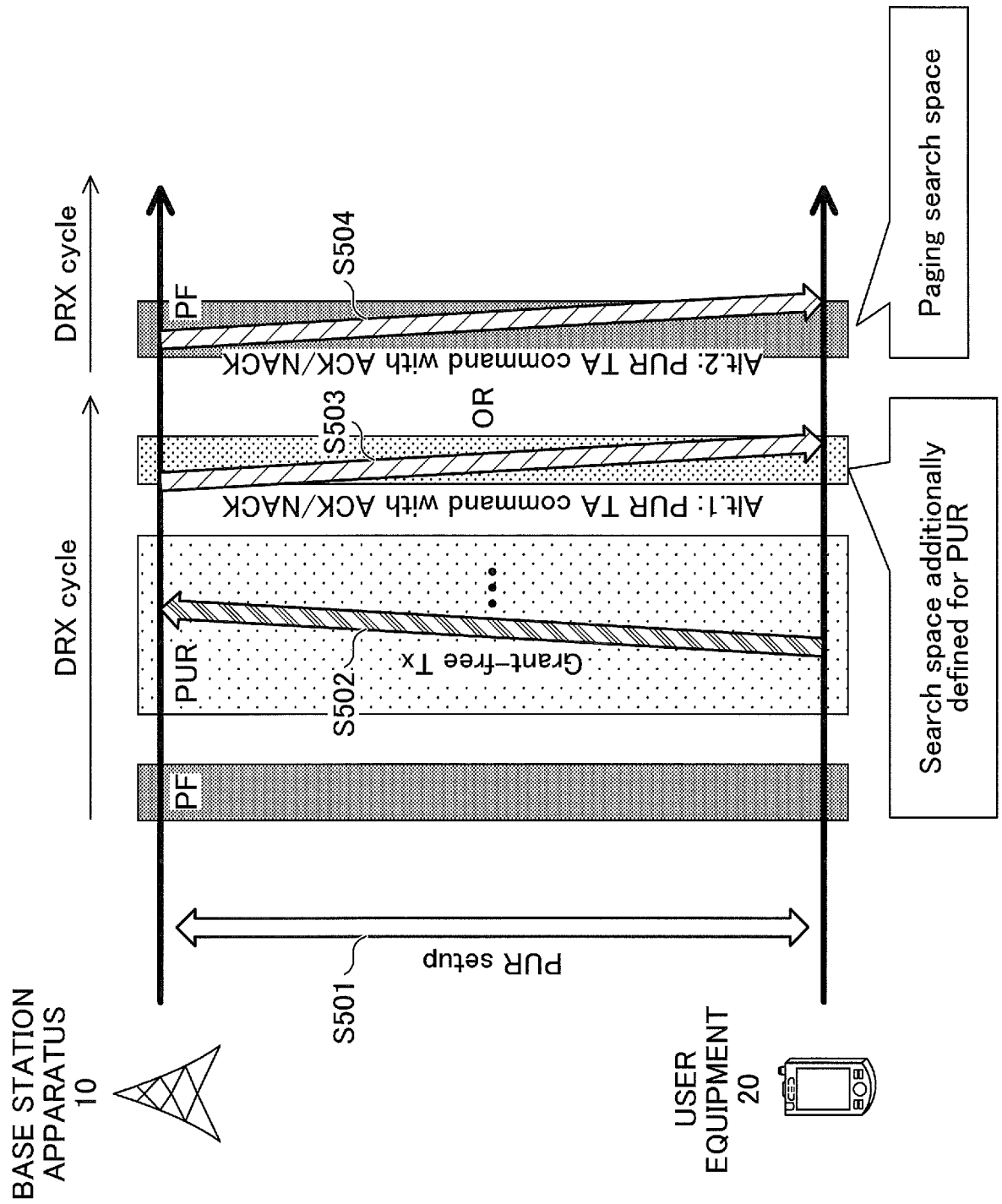
FIG. 8 is a sequence diagram for explaining an operation example according to an embodiment of the present invention.

FIG. 8 shows an example of a sequence when the PUR_TA command is transmitted. The PF (Paging Frame) shown in the figure is a system frame in which the user equipment 20 in the DRX (discontinuous reception) of the idle mode attempts to receive paging.

In S501, for example, information of PUR resources (for example, a period, a resource position, a resource size, or the like) is transmitted from the base station apparatus 10 to the user equipment 20 so that PUR configuration is performed.

In S501, an additional search space may be configured along with the PUR configuration. Further, in S501, configuration of the TA timer (notifying the setting value of the TA timer) may be performed. At this time, a default value of TA may be included in the configuration information of the TA timer.

In S502, the user equipment 20 transmits data using a PUR. Either S503 or S504 is performed. In S503, the base station apparatus 10 transmits a PUR_TA command together with ACK/NACK to the user equipment 20 in the search space configured additionally for PUR. The ACK/NACK is ACK/NACK for data transmission in S502.

In S504, the base station apparatus 10 transmits the PUR_TA command together with the ACK/NACK to the user equipment 20 by the paging search space. The ACK/NACK is an ACK/NACK for data transmission in S502.

Next, a restart of the TA timer in each of the user equipment 20 and the base station apparatus 10 will be described. Note herein that "restart" means initializing and starting a running timer. "Start" means to activate a timer that is not running. Also, "restart" may be replaced by any one of "update", "reset", and "initialize".

Hereinafter, an example of the control regarding the restart of the TA timer will be described. However, the control described below may be applied to the control of start of the TA timer that is not running.

<Restart of TA Timer in User Equipment 20>

First, the restart of the TA timer in the user apparatus 20 will be described. In the present example, the user apparatus 20 restarts the TA timer based on, for example, reception, from the base station apparatus 10, of a PUR_TA command, PUR configuration information (PUR setup), or PUR reconfiguration information (PUR reconfiguration). A TA update command (TA update command) may be included in any of the PUR_TA command, PUR configuration information (PUR setup), and PUR reconfiguration information (PUR reconfiguration). When the user equipment 20 detects that received information includes the TA update command, the user equipment 20 may restart the TA timer.

The user equipment 20 may restart the TA timer when a downlink signal (or data) other than the above-described signals is received from the base station apparatus 10 in a resource other than PUR or PUR.

When detecting that the TA timer expires, the user equipment 20 determines that the PUR configured in the user equipment 20 is released. That is, after the TA timer expires, the user equipment 20 does not perform transmission using the PUR.

<Restart of the TA Timer in the Base Station Apparatus 10>

Next, restart of the TA timer in the base station apparatus 10 will be described. The base station apparatus 10 has a TA timer for each user equipment that is a communication partner. In the present example, the base station apparatus 10 restarts the TA timer for the user equipment 20 based on reception, from the user equipment 20, of an ACK feedback for the "PUR_TA command, PUR configuration information (PUR setup), or PUR reconfiguration information (PUR reconfiguration)". Any of these ACK feedbacks may include a TA update command.

The base station apparatus 10 may restart the TA timer when an uplink signal (or data) other than the above-described signal is received from the user equipment 10 in a resource other than PUR or PUR.

When detecting that the TA timer expires, the base station apparatus 10 determines that the PUR for the user equipment 20 configured in the base station apparatus 10 is released. That is, after the TA timer expires, the base station apparatus 10 does not expect reception of a signal using the PUR from the user equipment 20.

<Sequence Example Related to Restarting TA Timer>

Figure 9:
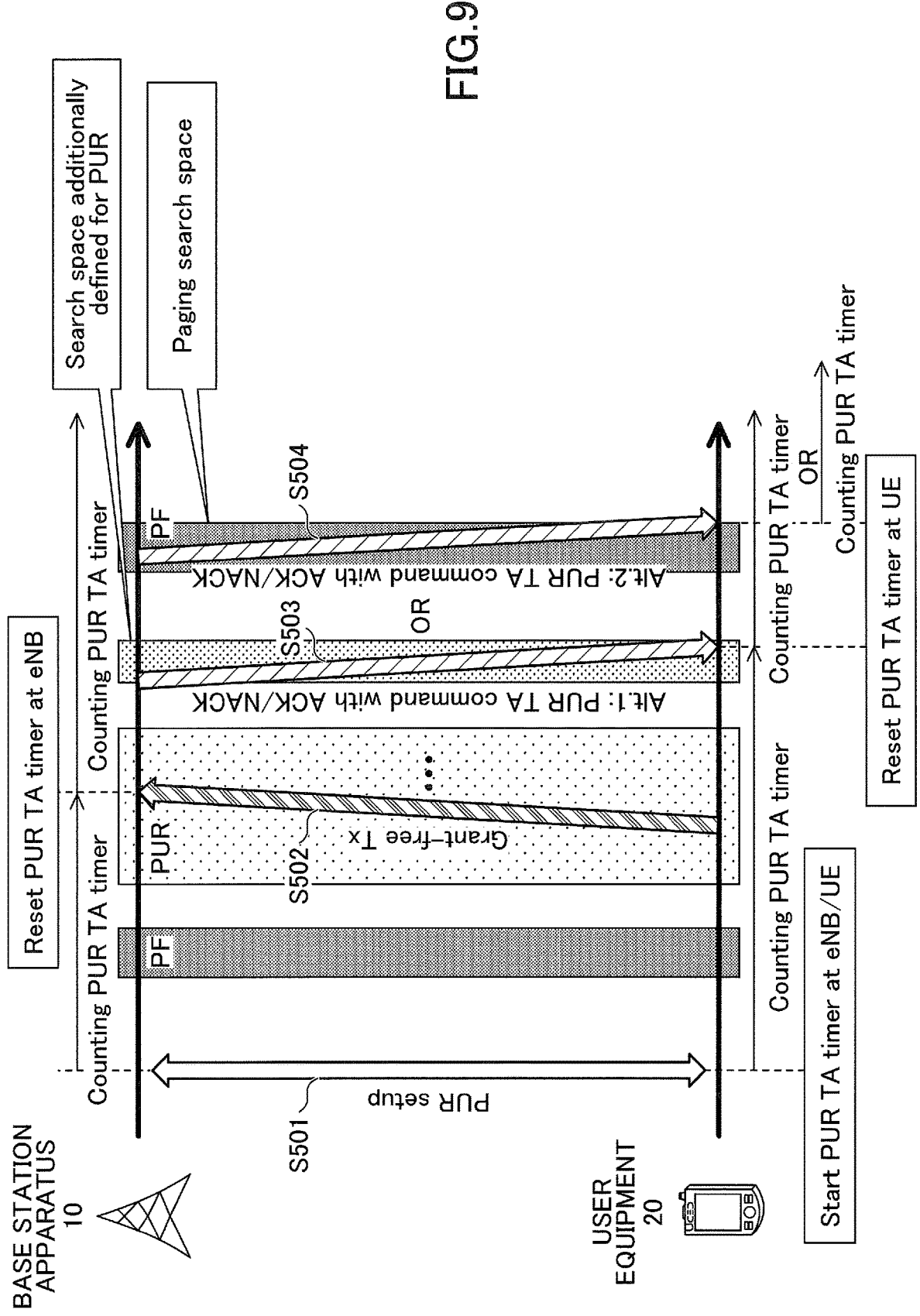
FIG. 9 is a sequence diagram for explaining an operation example according to an embodiment of the present invention.

FIG. 9 shows an example of a sequence involved in restarting the TA timer. PUR is configured in S501. Here, for example, the user apparatus 20 starts the TA timer when the PUR configuration information is received. The base station apparatus 10 starts the TA timer when, for example, a response (for example, an ACK, a message indicating configuration completion) to the PUR configuration information transmission is received from the user equipment 20.

In S502, the user equipment 20 transmits data using a PUR. Upon receiving the data, the base station apparatus 10 restarts the TA timer.

In S503 or S504, the base station apparatus 10 transmits a PUR_TA command together with ACK/NACK for S502. Upon receiving the PUR_TA command, the user equipment 20 restarts the TA timer.

In S503 or S504, the base station apparatus 10 may transmit the ACK/NACK to S502 without adding the PUR_TA command. In this case, for example, the user equipment 20 may restart the TA timer triggered by reception of the ACK/NACK.

As described above, in the example of FIG. 9, the TA timer is restarted based on the reception of data in the base station apparatus 10 and the reception of ACK/NACK in the user equipment 20. Therefore, when the data transmission and reception by the PUR are not performed for a predetermined period, the TA timer expires in both the base station apparatus 10 and the user equipment 20, and the PUR is released. Therefore, for example, other user equipments can utilize the PUR resources, thereby realizing effective utilization of resources.

Figure 10:
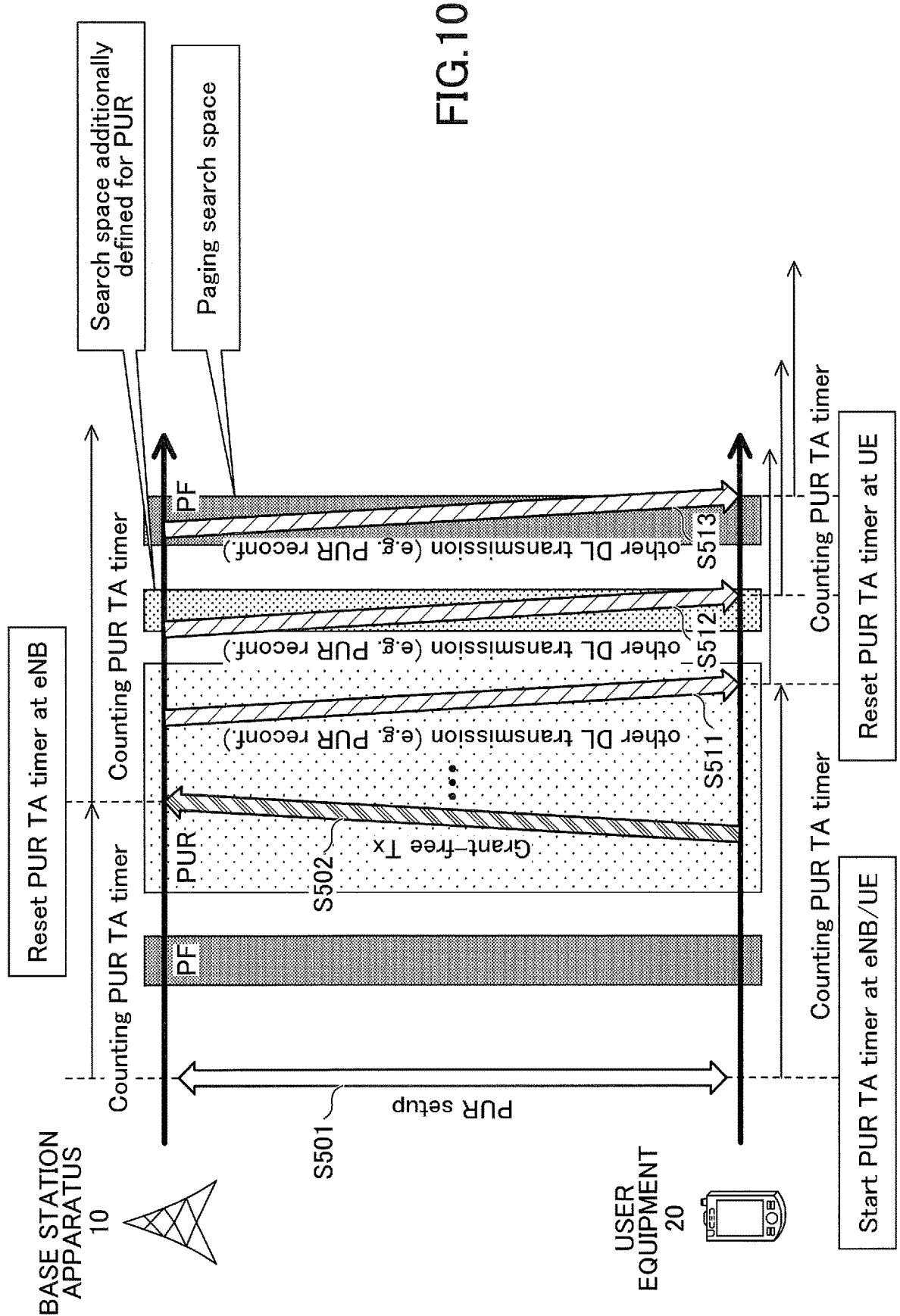
FIG. 10 is a sequence diagram for explaining an operation example according to an embodiment of the present invention.

FIG. 10 shows an example of another sequence involved in restarting the TA timer. S501 and S502 are the same as the example of FIG. 9.

In S511 (downlink transmission in PUR) or S512 (downlink transmission in additional search space) or S513 (downlink transmission in paging search space), the base station apparatus 10 transmits downlink data (or signal). The data is, for example, PUR reconfiguration information. The user equipment 20 restarts the TA timer being triggered by reception of the data. The base station apparatus 20 may transmit the PUR_TA command together with the downlink data.

The base station apparatus 10 may transmit a PUR_TA command together with a signal to be transmitted on the downlink control channel configured in connection with the PUR to the user equipment 20. The signal can be ACK/NACK or a signal other than ACK/NACK. For example, the downlink control channel may be configured from the base station apparatus 10 to the user equipment 20 when the PUR of S501 is configured, or it may be configured from the base station apparatus 10 to the user equipment 20 at a time other than S501. The relationship between the PUR and the downlink control channel may be described in the specification, and the user equipment 20 and the base station apparatus 10 may configure the downlink control channel linked to the PUR in accordance with the specification. Further, as an example of "linking", a resource of a predetermined band at a time predetermined time after the time position of the PUR may be used. The additional search space of S512 may be an example of a downlink control channel configured being linked with the PUR.

As described above, in the example of FIG. 10, the TA timer is restarted based on data reception in the base station apparatus 10 and data reception in the user equipment 20. Thus, if there is no data transmission and reception for a predetermined period, the TA timer expires in both the base station apparatus 10 and the user equipment 20, and the PUR is released. Therefore, for example, other user equipments can utilize the PUR resources, thereby realizing effective utilization of the resources.

In the present embodiment, an example of control concerning the TA timer has been described. However, the control concerning the TA timer described above may be applied to other timers.

(Equipment Configuration)

Next, a functional configuration example of the base station apparatus 10 and the user equipment 20 that perform the processes and operations described above will be described. The base station apparatus 10 and the user equipment 20 include all of the functions described above. However, each of the base station apparatus 10 and the user apparatus 20 may include only one of the functions described above.

<Base Station Apparatus 10>

Figure 11:
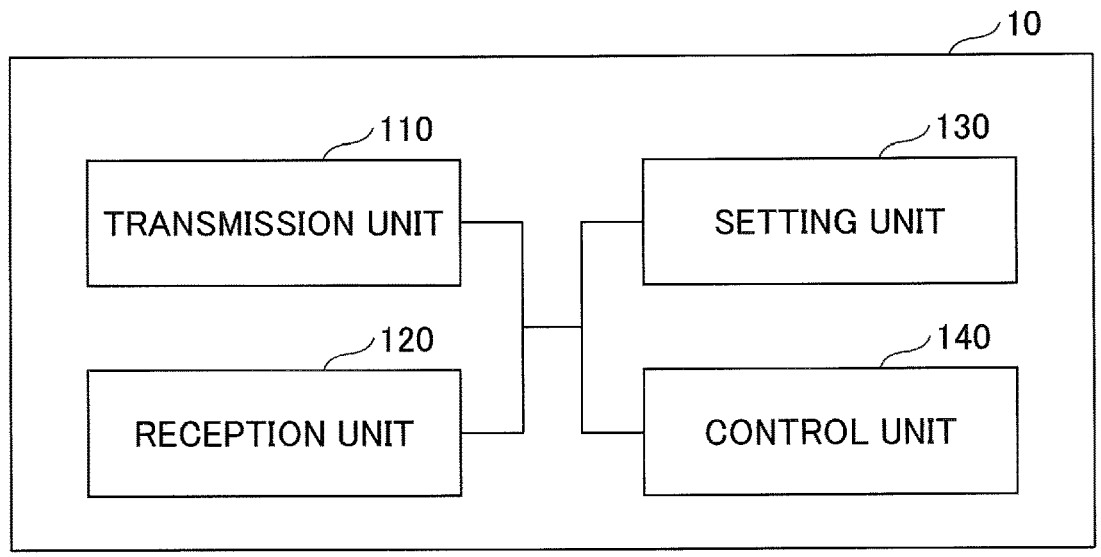
FIG. 11 is a diagram showing an example of a functional configuration of the base station apparatus 10 according to an embodiment of the present invention.

FIG. 11 is a diagram illustrating an example of a functional configuration of the base station apparatus 10. As shown in FIG. 11, the base station apparatus 10 includes a transmission unit 110, a reception unit 120, a setting unit 130, and a control unit 140. The functional configuration shown in FIG. 11 is only one example. As long as the operation according to the embodiments of the present invention can be performed, the functional category and the name of the functional unit may be any one.

The transmission unit 110 includes a function for generating a signal to be transmitted to the user equipment 20 side and transmitting the signal wirelessly. The receiving unit 120 includes a function for receiving various signals transmitted from the user equipment 20 and acquiring, for example, information of a higher layer from the received signals.

The setting unit 130 stores preconfigured configuration information and various configuration information to be transmitted to the user equipment 20 in the storage device of the setting unit 130 and reads the preconfigured configuration information from the storage device if necessary. The control unit 140 has a timer, such as a TA timer. For example, the control unit 140 starts or restarts a timer, such as a TA timer, when a signal is received from a user equipment. A function unit related to signal transmission in the control unit 140 may be included in the transmission unit 110, and a function unit related to signal reception in the control unit 140 may be included in the receiving unit 120.

<User Equipment 20>

Figure 12:
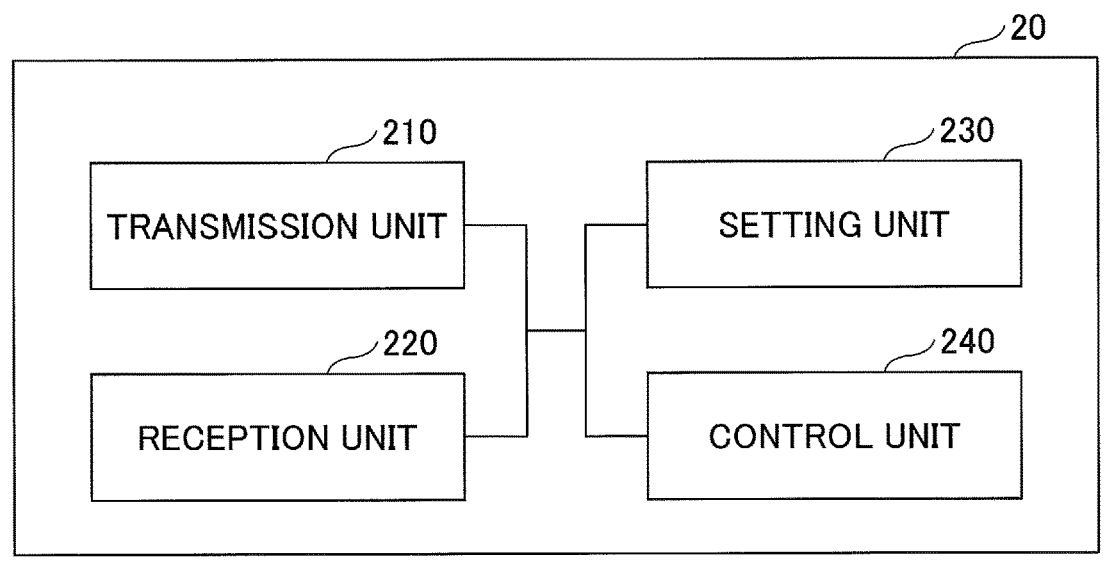
FIG. 12 is a diagram showing an example of a functional configuration of the user equipment 20 according to an embodiment of the present invention.
Figure 13:
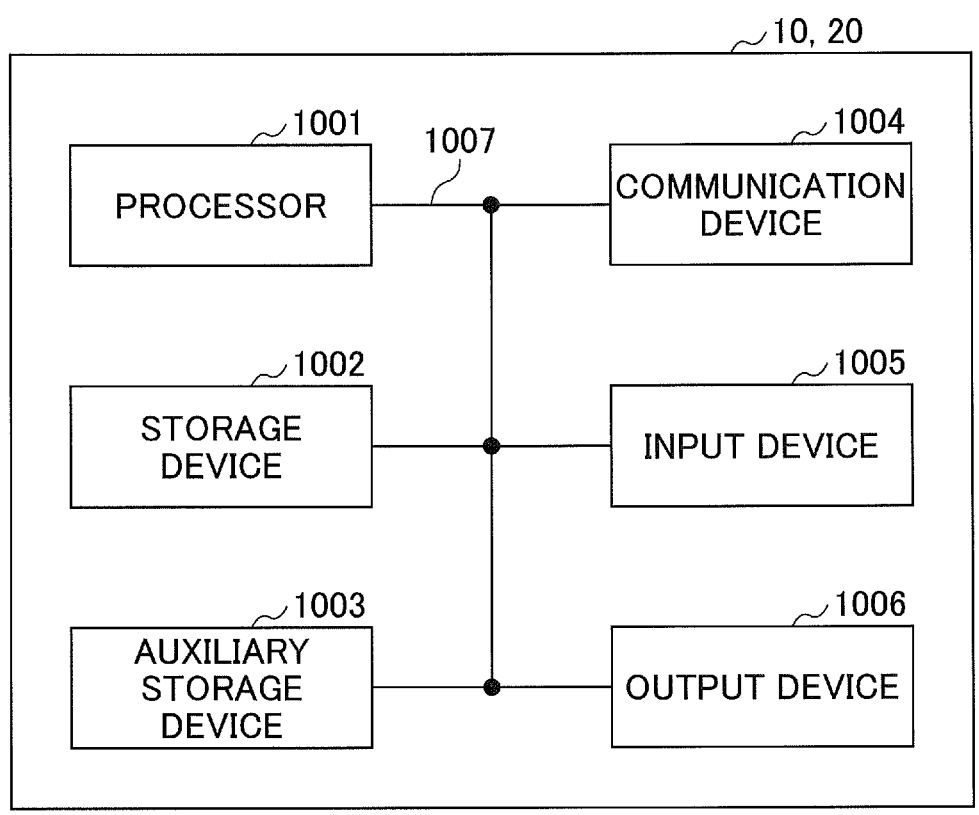
FIG. 13 is a diagram showing an example of a hardware configuration of the base station apparatus 10 or the user equipment 20 according to an embodiment of the present invention.

FIG. 12 is a diagram illustrating an example of a functional configuration of the user equipment 20. As shown in FIG. 12, the user equipment 20 includes a transmission unit 210, a reception unit 220, a setting unit 230, and a control unit 240. The functional configuration shown in FIG. 12 is only one example. As long as the operation according to the embodiments of the present invention can be performed, the functional category and the name of the functional unit may be any one.

The transmission unit 210 creates a transmission signal from the transmission data and wirelessly transmits the transmission signal. The receiving unit 220 receives various signals wirelessly and acquires signals from higher layers from the received signal of the physical layer.

The setting unit 230 stores various configuration information received from the base station apparatus 10 by the receiving unit 220 in the storage device of the setting unit 230 and reads it from the storage device as necessary. The setting unit 230 also stores the preconfigured configuration information. The control unit 240 has a timer, such as a TA timer. For example, the control unit 240 starts or restarts a timer, such as a TA timer, when a signal is received from the base station apparatus 10. A function unit related to signal transmission in the control unit 240 may be included in the transmission unit 210, and a function unit related to signal reception in the control unit 240 may be included in the receiving unit 220.

<Hardware Configuration>

The block diagrams (FIGS. 11 and 12) used for explaining the above embodiment illustrate blocks in units of functions. These functional blocks (constituting units) are implemented by any combinations of at least one of hardware and software. In this regard, a method for implementing the various functional blocks is not particularly limited. That is, each functional block may be implemented by one device united physically and logically. Alternatively, each functional block may be implemented by connecting directly or indirectly (for example, in a wired or wireless manner) two or more devices that are physically or logically separated and connected together and using these multiple devices. The functional block may be implemented by combining software with the single device or multiple devices.

Functions include, but are not limited to, determining, calculating, processing, deriving, investigating, searching, confirming, receiving, transmitting, outputting, accessing, resolving, selecting, establishing, comparing, assuming, expecting, considering, broadcasting, notifying, communicating, forwarding, configuring, reconfiguring, allocating, mapping, assigning, and the like. For example, a functional block (constituting unit) that has a function of transmitting is referred to as a transmitting unit or a transmitter. As described above, a method for implementing these functions is not particularly limited.

For example, the base station apparatus 10, the user equipment 20, and the like according to one embodiment of the present disclosure may function as a computer that performs processing of a wireless communication according to the present disclosure. FIG. 11 is a drawing illustrating an example of a hardware configuration of the base station apparatus 10 or the user equipment 20 according to an embodiment of the present disclosure. Each of the base station apparatus 10 and user equipment 20 may be physically configured as a computer device including a processor 1001, a storage device 1002, an auxiliary storage device 1003, a communication device 1004, an input device 1005, an output device 1006, a bus 1007, and the like.

It is noted that, in the following description, the term "device" may be read as a circuit, an apparatus, a unit, or the like. The hardware configurations of the base station apparatus 10 and the user equipment 20 may be configured to include one or more of the devices illustrated in drawings, or may be configured not to include some of the devices.

Each function of the base station apparatus 10 and the user equipment 20 may be implemented by reading predetermined software (program) to hardware such as the processor 1001, the storage device 1002, or the like, causing the processor 1001 to perform operations, controlling communication by the communication device 1004, and controlling at least one of reading and writing of data in the storage device 1002 and the auxiliary storage device 1003.

The processor 1001 executes, for example, an operating system to control the overall operation of the computer. The processor 1001 may be a central processing unit (CPU) including an interface with peripheral devices, a control device, an arithmetic device, a register, and the like. For example, the control unit 140, the control unit 240, and the like described above may be realized by the processor 1001.

The processor 1001 reads a program (program code), a software module, or data from at least one of the auxiliary storage device 1003 and the communication device 1004 onto the storage device 1002, and performs various processes according to the program, the software module, or the data. As the program, a program that causes a computer to perform at least some of the operations described in the embodiment explained above is used. For example, the control unit 140 of the base station apparatus 10, as illustrated in FIG. 9, may be implemented by a control program that is stored in the storage device 1002 and that is executed by the processor 1001. Also, for example, the control unit 240 of the user equipment 20, as illustrated in FIG. 10, may be implemented by a control program that is stored in the storage device 1002 and that is executed by the processor 1001. Explanation has been provided above for the case in which the above various processing are performed by the single processor 1001. However, such processing may be simultaneously or sequentially performed by two or more processors 1001. The processor 1001 may be implemented with one or more chips. It is noted that the program may be transmitted from a network through an electronic communication line.

The storage device 1002 is a computer-readable recording medium and may be constituted by at least one of, for example, a ROM (Read Only Memory), an EPROM (Erasable Programmable ROM), an EEPROM (Electrically Erasable Programmable ROM), a RAM (Random Access Memory), and the like. The storage device 1002 may also be referred to as a register, a cache, a main memory (main storage device), or the like. The storage device 1002 can store a program (program code), a software module and the like that can be executed to perform a communication method according to an embodiment of the present disclosure.

The auxiliary storage device 1003 is a computer-readable recording medium and may be configured by at least one of, for example, an optical disk such as a CD-ROM (Compact Disc ROM), a hard disk drive, a flexible disk, a magneto-optical disk (for example, a compact disk, a digital versatile disk, or a Blu-ray (registered trademark) disk), a smart card, a flash memory (for example, a card, a stick, or a key drive), a floppy (registered trademark) disk, a magnetic strip, and the like. The auxiliary storage device 1003 may be referred to as an auxiliary storage device. The above storage medium may be, for example, a database, a server, or other appropriate media including at least one of the storage device 1002 and the auxiliary storage device 1003.

The communication device 1004 is hardware (a transmission and reception device) for performing communication between computers through at least one of a wired and wireless networks and may also be referred to as, for example, a network device, a network controller, a network card, a communication module, or the like. The communication device 1004 may include, for example, a radio frequency switch, a duplexer, a filter, a frequency synthesizer, or the like to implement at least one of a frequency division duplex (FDD) and a time division duplex (TDD). For example, a transmission and reception antenna, an amplifier, a transmitting and receiving unit, a transmission line interface, and the like may be implemented by the communication device 1004. The transmitting and receiving unit may be implemented in such a manner that a transmitting unit and a receiving unit are physically or logically separated.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. It is noted that the input device 1005 and the output device 1006 may be integrated with each other (for example, a touch panel).

The devices, such as the processor 1001 and the storage device 1002, are connected to each other via a bus 1007 for communicating information. The bus 1007 may be constituted by using a single bus, or may be constituted by using busses different depending on devices.

The base station apparatus 10 and the user equipment 20 may include hardware, such as a microprocessor, a digital signal processor (DSP), an ASIC (Application Specific Integrated Circuit), a PLD (Programmable Logic Device), or an FPGA (Field Programmable Gate Array), or alternatively, some or all of the functional blocks may be implemented by the hardware. For example, the processor 1001 may be implemented with at least one of these hardware components.

(Summary of Embodiments)

According to this embodiment, at least a user equipment, a base station apparatus, and a communication method described in the following items are provided.

Item 1

A user equipment including:
   a transmission unit that transmits a signal to a base station apparatus using a preconfigured uplink resource;
   a reception unit that receives a signal from the base station apparatus; and
   a control unit that starts or restarts a predetermined timer in response to receiving the signal from the base station apparatus.

The paragraph "starts or restarts a predetermined timer in response to receiving the signal" include at least both meaning of "using reception of a signal as a trigger of start or restart of the predetermined timer", and, "triggering restart of the predetermined timer according to contents (information instructing restart) in addition to reception of a signal".

Item 2

The user equipment as described in item 1, wherein the reception unit receives the signal in a search space for receiving ACK or NACK to an uplink signal transmitted by the resource, or in the resource.

Item 3

The user equipment as described in item 1 or 2, wherein the predetermined timer is a time alignment timer that times a valid period of a timing advance for transmission by the resource.

Item 4

A base station apparatus including:
   a transmission unit that transmits configuration information to a user equipment for preconfiguring an uplink resource;
   a reception unit that receives a signal from a user equipment using the resource; and
   a control unit that starts or restarts a predetermined timer in response to receiving the signal.

Item 5

The base station apparatus as described in item 4, wherein the transmission unit transmits a timing advance command to the user equipment along with ACK or NACK for a signal received using the resource, or along with a signal transmitted over a downlink control channel that is associated with a preconfigured uplink resource.

Item 6

A communication method executed by a user equipment comprising:
   a transmission step of transmitting a signal to a base station apparatus using a preconfigured uplink resource;
   a reception step of receiving a signal from the base station apparatus; and
   a control step of starting or restarting a predetermined timer in response to receiving the signal from the base station apparatus.

Items 1, 4 and 6 provide a technology that enables proper control of a timer in a wireless communication system in which transmission using preconfigured uplink resource is performed. In addition, according to items 2, 3, and 5, for example, when there is no signal transmission and reception, the timer expires and the resources can be effectively utilized.

<Supplements to Embodiment>

The embodiment of the present invention has been described above, but the disclosed invention is not limited to the above embodiment, and those skilled in the art would understand that various modified examples, revised examples, alternative examples, substitution examples, and the like can be made. In order to facilitate understanding of the present invention, specific numerical value examples are used for explanation, but the numerical values are merely examples, and any suitable values may be used unless otherwise stated. Classifications of items in the above description are not essential to the present invention, contents described in two or more items may be used in combination if necessary, and contents described in an item may be applied to contents described in another item (unless a contradiction arises). The boundaries between the functional units or the processing units in the functional block diagrams do not necessarily correspond to the boundaries of physical components. Operations of a plurality of functional units may be physically implemented by a single component and an operation of a single functional unit may be physically implemented by a plurality of components. Concerning the processing procedures described above in the embodiment, the orders of steps may be changed unless a contradiction arises. For the sake of convenience for describing the processing, the base station apparatus 10 and the user equipment 20 have been described with the use of the functional block diagrams, but these apparatuses may be implemented by hardware, software, or a combination thereof. Each of software functioning with a processor of the base station apparatus 10 according to the embodiment of the present invention and software functioning with a processor of the user equipment 20 according to the embodiment of the present invention may be stored in a random access memory (RAM), a flash memory, a read-only memory (ROM), an EPROM, an EEPROM, a register, a hard disk (HDD), a removable disk, a CD-ROM, a database, a server, or any suitable recording media.

Also, the notification of information is not limited to the aspect or embodiment described in the present disclosure, but may be performed by other methods. For example, the notification of information may be performed by physical layer signaling (for example, DCI (Downlink Control Information), UCI (Uplink Control Information)), higher layer signaling (for example, RRC (Radio Resource Control) signaling, MAC (Medium Access Control) signaling, broadcast information (an MIB (Master Information Block) and an SIB (System Information Block)), other signals, or combinations thereof. The RRC signaling may be also be referred to as an RRC message and may be, for example, an RRC connection setup message, an RRC connection reconfiguration message, or the like.

Each aspect and embodiment described in the present disclosure may be applied to at least one of a system that uses a suitable system such as LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (New Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), or Bluetooth (registered trademark), and a next-generation system expanded on the basis thereof. Also a plurality of systems may be combined and applied (for example, a combination of at least one of LTE and LTE-A with 5G, and the like).

In the operation procedures, sequences, flowcharts, and the like according to each aspect and embodiment described in the present disclosure, the orders of steps may be changed unless a contradiction arises. For example, in the methods described in the present disclosure, elements of various steps are illustrated by using an exemplary order and the methods are not limited to the specific orders presented.

The specific operations performed by the base station apparatus 10 described in the present disclosure may in some cases be performed by an upper node. It is clear that, in a network that includes one or more network nodes including the base station apparatus 10, various operations performed for communication with the user equipment 20 can be performed by at least one of the base station apparatus 10 and another network node other than the base station apparatus 10 (for example, a MME, a S-GW, or the like may be mentioned, but not limited thereto). In the above, the description has been made for the case where another network node other than the base station apparatus 10 is a single node as an example. But the another network node may be a combination of a plurality of other network nodes (for example, a MME and a S-GW).

Information, signals, or the like described in the present disclosure may be output from a higher layer (or a lower layer) to a lower layer (or a higher layer). Information, signals, or the like described in the present disclosure may be input and output via a plurality of network nodes.

Information or the like that has been input or output may be stored at a predetermined place (for example, a memory) and may be managed with the use of a management table. Information or the like that is input or output can be overwritten, updated, or appended. Information or the like that has been output may be deleted. Information or the like that has been input may be transmitted to another apparatus.

In the present disclosure, determination may be made with the use of a value expressed by one bit (0 or 1), may be made with the use of a Boolean value (true or false), and may be made through a comparison of numerical values (for example, a comparison with a predetermined value).

Regardless of whether software is referred to as software, firmware, middleware, microcode, a hardware description language, or another name, software should be interpreted broadly to mean instructions, instruction sets, codes, code segments, program codes, a program, a sub-program, a software module, an application, a software application, a software package, a routine, a subroutine, an object, an executable file, an execution thread, a procedure, a function, and the like.

Software, instructions, information, or the like may be transmitted and received through transmission media. For example, in a case where software is transmitted from a website, a server or another remote source through at least one of wired technology (such as a coaxial cable, an optical-fiber cable, a twisted pair, or a digital subscriber line (DSL)) and radio technology (such as infrared or microwaves), at least one of the wired technology and the radio technology is included in the definition of a transmission medium.

Information, signals, and the like described in the present disclosure may be expressed with the use of any one of various different technologies. For example, data, instructions, commands, information, signals, bits, symbols, chips, and the like mentioned herein throughout the above explanation may be expressed by voltages, currents, electromagnetic waves, magnetic fields or magnetic particles, optical fields or photons, or any combinations thereof.

The terms described in the present disclosure and the terms necessary for understanding the present disclosure may be replaced with terms having the same or similar meanings. For example, at least one of a channel and a symbol may be a signal (signaling). A signal may be a message. A component carrier (CC) may be referred to as a carrier frequency, a cell, a frequency carrier, or the like.

The terms "system" and "network" used in the present disclosure are used interchangeably.

Information, parameters, and the like described in the present disclosure may be expressed by absolute values, may be expressed by relative values with respect to predetermined values, and may be expressed by corresponding different information. For example, radio resources may be indicated by indexes.

The above-described names used for the parameters are not restrictive in any respect. In addition, formulas or the like using these parameters may be different from those explicitly disclosed in the present disclosure. Various channels (for example, a PUSCH, a PUCCH, a PDCCH, and the like) and information elements can be identified by any suitable names, and therefore, various names given to these various channels and information elements are not restrictive in any respect.

In the present disclosure, terms such as "base station (BS)", "radio base station", "base station apparatus", "fixed station", "NodeB", "eNodeB (eNB)", "gNodeB (gNB)", "access point", "transmission point", "reception point", "transmission/reception point", "cell", "sector", "cell group", "carrier", "component carrier", and the like may be used interchangeably. A base station may be referred to as a macro-cell, a small cell, a femtocell, a pico-cell, or the like.

A base station can accommodate one or a plurality of (for example, three) cells (that may be called sectors). In a case where a base station accommodates a plurality of cells, the whole coverage area of the base station can be divided into a plurality of smaller areas. For each smaller area, a base station subsystem (for example, an indoor miniature base station RRH (Remote Radio Head)) can provide a communication service. The term "cell" or "sector" denotes all or a part of the coverage area of at least one of a base station and a base station subsystem that provides communication services in the coverage.

In the present disclosure, terms such as "mobile station (MS)", "user terminal", "user equipment (UE)", and "terminal" may be used interchangeably.

By the person skilled in the art, a mobile station may be referred to as any one of a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, and other suitable terms.

At least one of a base station and a mobile station may be referred to as a transmitting apparatus, a receiving apparatus, a communication apparatus, or the like. At least one of a base station and a mobile station may be an apparatus mounted on a mobile body, or may be a mobile body itself, or the like. A mobile body may be a transporting device (e.g., a vehicle, an airplane, and the like), an unmanned mobile (e.g., a drone, an automated vehicle, and the like), or a robot (of a manned or unmanned type). It is noted that at least one of a base station and a mobile station includes an apparatus that does not necessarily move during a communication operation. For example, at least one of a base station and a mobile station may be an IoT (Internet of Thing) device such as a sensor.

In addition, a base station apparatus according to the present disclosure may be read as a user equipment. For example, each aspect or embodiment of the present disclosure may be applied to a configuration in which communication between a base station apparatus and a user equipment is replaced by communication between a plurality of user equipments 20 (that may be called D2D (Device-to-Device), V2X (Vehicle-to-Everything), or the like). In this case, a user equipment 20 may have above-described functions of the base station apparatus 10. In this regard, a word such as "up" or "down" may be read as a word corresponding to communication between terminals (for example, "side"). For example, an uplink channel, a downlink channel, or the like may be read as a side channel.

Similarly, a user equipment according to the present disclosure may be replaced with a base station apparatus. In this case, a base station apparatus may have above-described functions of the user equipment.

The term "determine" used herein may mean various operations. For example, judging, calculating, computing, processing, deriving, investigating, looking up, searching, inquiring (for example, looking up a table, a database, or another data structure), ascertaining, or the like may be deemed as making determination. Also, receiving (for example, receiving information), transmitting (for example, transmitting information), inputting, outputting, or accessing (for example, accessing data in a memory), or the like may be deemed as making determination. Also, resolving, selecting, choosing, establishing, comparing, or the like may be deemed as making determination. That is, doing a certain operation may be deemed as making determination. "To determine" may be read as "to assume", "to expect", "to consider", or the like.

Each of the terms "connected" and "coupled" and any variations thereof mean any connection or coupling among two or more elements directly or indirectly and can mean that one or a plurality of intermediate elements are inserted among two or more elements that are "connected" or "coupled" together. Coupling or connecting among elements may be physical one, may be logical one, and may be a combination thereof. For example, "connecting" may be read as "accessing". In a case where the terms "connected" and "coupled" and any variations thereof are used in the present disclosure, it may be considered that two elements are "connected" or "coupled" together with the use of at least one type of a medium from among one or a plurality of wires, cables, and printed conductive traces, and in addition, as some non-limiting and non-inclusive examples, it may be considered that two elements are "connected" or "coupled" together with the use of electromagnetic energy such as electromagnetic energy having a wavelength of the radio frequency range, the microwave range, or the light range (including both of the visible light range and the invisible light range).

A reference signal can be abbreviated as an RS (Reference Signal). A reference signal may be referred to as a pilot depending on an applied standard.

A term "based on" used in the present disclosure does not mean "based on only" unless otherwise specifically noted. In other words, a term "base on" means both "based on only" and "based on at least".

Any references to elements denoted by a name including terms such as "first" or "second" used in the present disclosure do not generally limit the amount or the order of these elements. These terms can be used in the present disclosure as a convenient method for distinguishing one or a plurality of elements. Therefore, references to first and second elements do not mean that only the two elements can be employed or that the first element should be, in some way, prior to the second element.

"Means" in each of the above apparatuses may be replaced with "unit", "circuit", "device", or the like.

In a case where any one of "include", "including", and variations thereof is used in the present disclosure, each of these terms is intended to be inclusive in the same way as the term "comprising". Further, the term "or" used in the present disclosure is intended to be not exclusive-or.

A radio frame may include, in terms of time domain, one or a plurality of frames. Each of one or a plurality of frames may be referred to as a subframe in terms of time domain. A subframe may include, in terms of time domain, one or a plurality of slots. A subframe may have a fixed time length (e.g., 1 ms) independent of Numerology.

Numerology may be a communication parameter that is applied to at least one of transmission and reception of a signal or a channel. Numerology may mean, for example, at least one of a subcarrier spacing (SCS), a bandwidth, a symbol length, a cyclic prefix length, a transmission time interval (TTI), the number of symbols per TTI, a radio frame configuration, a specific filtering processing performed by a transceiver in frequency domain, a specific windowing processing performed by a transceiver in time domain, and the like.

A slot may include, in terms of time domain, one or a plurality of symbols (OFDM (Orthogonal Frequency Division Multiplexing) symbols, SC-FDMA (Single Carrier Frequency Division Multiplexing) symbols) symbols, or the like). A slot may be a time unit based on Numerology.

A slot may include a plurality of minislots. Each minislot may include one or a plurality of symbols in terms of the time domain. A minislot may also be referred to as a subslot. A minislot may include fewer symbols than a slot. A PDSCH (or PUSCH) transmitted at a time unit greater than a minislot may be referred to as a PDSCH (or PUSCH) mapping type A. A PDSCH (or PUSCH) transmitted using minislots may be referred to as a PDSCH (or PUSCH) mapping type B.

Each of a radio frame, a subframe, a slot, a minislot, and a symbol means a time unit configured to transmit a signal. Each of a radio frame, a subframe, a slot, a minislot, and a symbol may be referred to as other names respectively corresponding thereto.

For example, one subframe may be referred to as a transmission time interval (TTI), a plurality of consecutive subframes may be referred to as a TTI, and one slot or one minislot may be referred to as a TTI. That is, at least one of a subframe and a TTI may be a subframe (1 ms) according to the existing LTE, may have a period shorter than 1 ms (e.g., 1 to 13 symbols), and may have a period longer than 1 ms. Instead of subframes, units expressing a TTI may be referred to as slots, minislots, or the like.

A TTI means, for example, a minimum time unit of scheduling in radio communication. For example, in an LTE system, a base station performs scheduling for each user equipment 20 to assign, in TTI units, radio resources (such as frequency bandwidths, transmission power, and the like that can be used by each user equipment 20). However, the definition of a TTI is not limited thereto.

A TTI may be a transmission time unit for channel-coded data packets (transport blocks), code blocks, code words, or the like, and may be a unit of processing such as scheduling, link adaptation, or the like. When a TTI is given, an actual time interval (e.g., the number of symbols) to which transport blocks, code blocks, code words, or the like are mapped may be shorter than the given TTI.

In a case where one slot or one minislot is referred to as a TTI, one or a plurality of TTIs (i.e., one or a plurality of slots or one or a plurality of minislots) may be a minimum time unit of scheduling. The number of slots (the number of minislots) included in the minimum time unit of scheduling may be controlled.

A TTI having a time length of 1 ms may referred to as an ordinary TTI (a TTI according to LTE Rel. 8-12), a normal TTI, a long TTI, an ordinary subframe, a normal subframe, a long subframe, a slot, or the like. A TTI shorter than an ordinary TTI may be referred to as a shortened TTI, a short TTI, a partial or fractional TTI, a shortened subframe, a short subframe, a minislot, a subslot, a slot, or the like.

Note that a long TTI (for example, normal TTI, subframe, and the like) may be read as TTI having a time length exceeding 1 ms, and a short TTI (for example, shortened TTI) may be read as a TTI having a TTI length less than the TTI length of the long TTI and equal to or more than 1 ms.

A resource block (RB) is a resource assignment unit in terms of time domain and frequency domain and may include one or a plurality of consecutive subcarriers in terms of frequency domain. The number of subcarriers included in an RB may be the same regardless of Numerology, and, for example, may be 12. The number of subcarriers included in a RB may be determined based on Numerology.

In terms of time domain, an RB may include one or a plurality of symbols, and may have a length of 1 minislot, 1 subframe, or 1 TTI. Each of 1 TTI, 1 subframe, and the like may include one or a plurality of resource blocks.

One or a plurality of RBs may be referred to as physical resource blocks (PRBs: Physical RBs), a subcarrier group (SCG: Sub-Carrier Group), a resource element group (REG: Resource Element Group), a PRB pair, an RB pair, or the like.

A resource block may include one or a plurality of resource elements (RE: Resource Elements). For example, 1 RE may be a radio resource area of 1 subcarrier and 1 symbol.

A bandwidth part (BWP) (which may be called a partial bandwidth or the like) may mean a subset of consecutive common RBs (common resource blocks) for Numerology, in any given carrier. A common RB may be identified by a RB index with respect to a common reference point in the carrier. PRBs may be defined by a BWP and may be numbered in the BWP.

A BWP may include a BWP (UL BWP) for UL and a BWP (DL BWP) for DL. For a UE, one or a plurality of BWPs may be set in 1 carrier.

At least one of BWPs that have been set may be active, and a UE need not assume sending or receiving a predetermined signal or channel outside the active BWP. A "cell", a "carrier" or the like in the present disclosure may be read as a "BWP".

The above-described structures of radio frames, subframes, slots, minislots, symbols, and the like are merely examples. For example, the number of subframes included in a radio frame, the number of slots included in a subframe or a radio frame, the number of minislots included in a slot, the number of symbols and the number of RBs included in a slot or a minislot, the number of subcarriers included in an RB, the number of symbols included in a TTI, a symbol length, a cyclic prefix (CP) length, and the like can be variously changed.

Throughout the present disclosure, in a case where an article such as "a", "an", or "the" in English is added through a translation, the present disclosure may include a case where a noun following such article is of a plural forms.

Throughout the present disclosure, an expression that "A and B are different" may mean that "A and B are different from each other". Also this term may mean that "each of A and B is different from C". Terms such as "separate" and "coupled" may also be interpreted in a manner similar to "different".

Each aspect or embodiment described in the present disclosure may be solely used, may be used in combination with another embodiment, and may be used in a manner of being switched with another embodiment upon implementation. Notification of predetermined information (for example, notification of "being x") may be implemented not only explicitly but also implicitly (for example, by not notifying predetermined information).

In the present disclosure, SS block or CSI-RS is an example of a synchronization signal or a reference signal.

Although the present disclosure has been described above, it will be understood by those skilled in the art that the present disclosure is not limited to the embodiment described in the present disclosure. Modifications and changes of the present disclosure may be possible without departing from the subject matter and the scope of the present disclosure defined by claims. Therefore, the descriptions of the present disclosure are for illustrative purposes only, and are not intended to be limiting the present disclosure in any way.

REFERENCE SIGNS LIST

10 base station apparatus
110 transmission unit
120 reception unit
130 setting unit
140 control unit
20 user equipment
210 transmission unit
220 reception unit
230 setting unit
240 control unit
1001 processor
1002 storage device
1003 auxiliary storage device
1004 communication device
1005 input device
1006 output device

The invention claimed is:

1. A terminal comprising:
a processor configured to start or restart a time alignment timer counting a valid period of a timing advance for transmission of an uplink signal based on configuration information, received from a base station, on a resource of the uplink signal;
a transmitter configured to transmit the uplink signal to the base station using the resource; and
a receiver configured to receive a response signal to the uplink signal in a search space for receiving the response signal,
wherein the receiver receives an adjustment value of the timing advance from the base station, and the processor adjusts a value of the timing advance based on the adjustment value, and
wherein, while in idle mode to transmit the uplink signal, when the timing advance is indicated by an idle mode time alignment timer to be no longer valid, the receiver re-obtains a value of the timing advance after executing a random access procedure.

2. A base station comprising:
a processor configured to start or restart a time alignment timer counting a valid period of a timing advance for an uplink signal based on configuration information on a resource of the uplink signal;
a receiver configured to receive the uplink signal from a terminal using the resource; and
a transmitter configured to transmit a response signal to the uplink signal in a search space for transmitting the response signal,
wherein the transmitter transmits an adjustment value of the timing advance to the terminal, and the processor adjusts a value of the timing advance based on the adjustment value, and
wherein, while in idle mode to transmit the uplink signal, when the timing advance is indicated by an idle mode time alignment timer to be no longer valid, the terminal re-obtains a value of the timing advance after executing a random access procedure.

3. A communication system comprising:
a base station comprising:
a processor configured to start or restart a time alignment timer counting a valid period of a timing advance for an uplink signal based on configuration information on a resource of the uplink signal;
a receiver configured to receive the uplink signal from a terminal using the resource; and
a transmitter configured to transmit a response signal to the uplink signal in a search space for transmitting the response signal,
wherein the transmitter transmits an adjustment value of the timing advance to the terminal, and the processor adjusts a value of the timing advance based on the adjustment value, and
the terminal comprising:
a processor configured to start or restart a time alignment timer counting a valid period of a timing advance for transmission of an uplink signal based on configuration information, received from the base station, on a resource of the uplink signal;
a transmitter configured to transmit the uplink signal to the base station using the resource; and
a receiver configured to receive a response signal to the uplink signal in a search space for receiving the response signal,
wherein the receiver receives an adjustment value of the timing advance from the base station, and the processor adjusts a value of the timing advance based on the adjustment value, and
wherein, while in idle mode to transmit the uplink signal, when the timing advance is indicated by an idle mode time alignment timer to be no longer valid, the receiver re-obtains a value of the timing advance after executing a random access procedure.

4. A communication method of a terminal, comprising:
starting or restarting a time alignment timer counting a valid period of a timing advance for transmission of an uplink signal based on configuration information, received from a base station, on a resource of the uplink signal;
transmitting the uplink signal to the base station using the resource; and
receiving a response signal to the uplink signal in a search space for receiving the response signal,
wherein the terminal receives an adjustment value of the timing advance from the base station, and adjusts a value of the timing advance based on the adjustment value, and
wherein, while in idle mode to transmit the uplink signal, when the timing advance is indicated by an idle mode time alignment timer to be no longer valid, the terminal re-obtains a value of the timing advance after executing a random access procedure.

* * * * *